United States Patent
Kreis et al.

(10) Patent No.: US 12,221,281 B2
(45) Date of Patent: Feb. 11, 2025

(54) SYSTEMS AND METHODS FOR OPTIMIZING PICK RATE

(71) Applicant: Ocado Innovation Limited, Hatfield (GB)

(72) Inventors: Jeff Kreis, Wolfeboro, NH (US); Alexa Mellon, Cambridge, MA (US)

(73) Assignee: Ocado Innovation Limited, Hatfield (GB)

( * ) Notice: Subject to any disclaimer, the term of this patent is extended or adjusted under 35 U.S.C. 154(b) by 889 days.

(21) Appl. No.: 17/169,777

(22) Filed: Feb. 8, 2021

(65) Prior Publication Data

US 2022/0250844 A1    Aug. 11, 2022

(51) Int. Cl.
*B65G 1/137* (2006.01)
*G05D 1/00* (2024.01)
*G06Q 10/087* (2023.01)

(52) U.S. Cl.
CPC ......... *B65G 1/1375* (2013.01); *G05D 1/0212* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 6,721,762 B1 * | 4/2004 | Levine | G06Q 10/08 707/999.102 |
| 11,068,960 B2 * | 7/2021 | Xu | G06Q 30/0629 |
| 11,514,386 B1 * | 11/2022 | Soles | G06Q 10/083 |
| 2016/0304299 A1 * | 10/2016 | Daun | G06Q 50/28 |
| 2018/0018619 A1 * | 1/2018 | Kisiler | G06Q 10/083 |
| 2020/0387154 A1 * | 12/2020 | Sellner | B66F 9/07581 |
| 2021/0233145 A1 * | 7/2021 | Joshi | G06N 20/00 |

* cited by examiner

*Primary Examiner* — Jacob S. Scott
*Assistant Examiner* — Erin Morris
(74) *Attorney, Agent, or Firm* — Foley & Lardner LLP

(57) ABSTRACT

Disclosed are systems and methods for optimizing a pick rate based on an optimized arrangement of products in a tote and an optimizing pick path. The arrangement of the products in the tote are based on one or more parameters of the tote and one or more attributes of each of the products. Parameters of the tote include a pack density and maximum weight capacity. Attributes of the products include a volume, fragility, weight, hazard, and orientation. The arrangement of the products in the tote dictate the path a picker takes to collect the products. Products collected at a first instant in time are placed at the bottom of the tote while products collected at a later instant in time are placed closer to the top of the tote. The analytics server transmits instructions for arranging the products in the tote such that a picker optimally orients the products.

20 Claims, 23 Drawing Sheets

SYSTEMS AND METHODS FOR OPTIMIZING PICK RATE

TECHNICAL FIELD

This application relates generally to enhancing product placement in a tote and selecting a path to each of the products in the tote based on the placement of the products in the tote.

BACKGROUND

One metric associated with warehouse productivity (or the productivity of other storage facilities) is a pick rate. Traditionally, pick rates are improved by optimizing the path a picker takes to pick products in one or more orders. For example, in an effort to more efficiently pick to increase the pick rate, pickers may be directed to pick products based on the proximity of the products to other products in the order, the current position of the picker in the warehouse (or other storage facility), and the like.

BRIEF DESCRIPTION OF THE DRAWINGS

The accompanying drawings constitute a part of this specification and illustrate embodiments of the subject matter disclosed herein.

DETAILED DESCRIPTION

Figure 1:
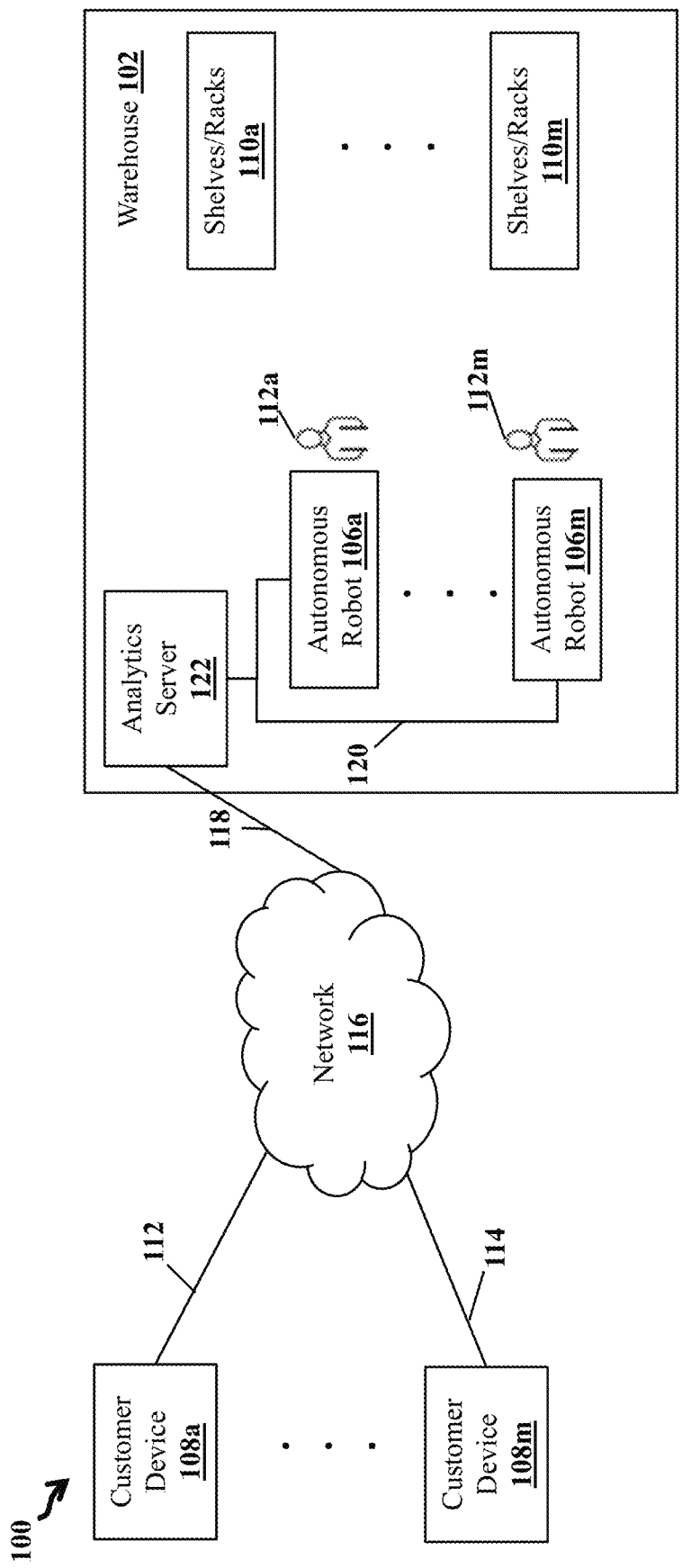
FIG. 1 shows a system for determining an optimal arrangement of products in a tote and a pick path, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

There remains a desire to continue to improve pick rate. Pickers use containers (or totes) to store products as the pickers navigate a warehouse. For example, the picker may place collected products in totes on autonomous robots (may also be referred to as carts). Conventional methods and systems do not optimize the pick rate based on optimizing the arrangement of products in the totes.

I. Components and Operations of Illustrative Systems

FIG. 1 illustrates a system 100 for determining an optimal arrangement of products in a tote and a pick path, according to an embodiment. The system 100 includes a number of customer devices 108a to 108m (collectively referred to as device(s) 108) connected to a communications network 116. The communications network 116 connects to an analytics server 122 in a warehouse 102. The warehouse 102 may contain autonomous robots 106a to 106m (collectively referred to as autonomous robot(s) 106), pickers (or other workers) 112a to 112m (collectively referred to as picker(s) 112) and shelves/racks/bins 110a to 110m (collectively referred to as bin(s) 110). It should be appreciated that embodiments may include or otherwise implement any number of devices capable of performing the various features and tasks described herein. For example, FIG. 1 shows the analytics server 122 as a distinct computing device in the warehouse 102. In some embodiments, the analytics server 122 may be located in a different warehouse or capable of communicating with analytics servers 122 in various warehouses.

Devices 108

The system 100 includes a number of devices 108, which customers (or other users) can operate to place orders for products. The customer may be an individual, a group of individuals, a corporation, or other entity. For example, a product order for an individual may contain groceries such as one carton of milk, one package of cheese, and two bags of chips. In another example, a product order for a business may contain 100 light bulbs. The retailer may hold the products in one or more warehouses 102.

Network 116

The devices 108 are coupled via communications links 112, 114, respectively, by communications network 116 (e.g., Internet) and by communications link 118, to an order processing and/or analytics server 122 associated with the warehouse 102. The communications network 116 may be a public or private network. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

Analytics Server 122

The analytics server 122 has at least one processor and computer-readable instructions stored on a non-transitory computer-readable medium, where the at least one processor is configured to execute the computer-readable instructions. The analytics server 122 is associated with warehouse 102 and may be physically located at the warehouse 102 or located remotely from warehouse 102. The analytics server 122 may comprise computing devices operating in a distributed or cloud computing configuration and/or in a virtual machine configuration. In some configurations, functions of the analytics server 122 may be partly or entirely performed by the computing devices in the cloud and/or in the warehouse 102.In the schematic embodiment shown in FIG. 1, the analytics server 122 is shown as being a component of the warehouse 102, which may represent a physical and/or remote location of the analytics server 122 or its functionality. The analytics server 122 may be implemented as a distributed system or as a single device. In the case of a distributed system, one or more processors located outside the warehouse or in other devices may be, and sometimes are, used to perform one or more steps attributed to the analytics server 122 in this embodiment.

The analytics server 122 communicates with devices 108 and autonomous robots 106. The communications may include determining, generating, instructing, and sending assignments to devices 108 or autonomous robots 106. The instructions may include a path to navigate around the warehouse, picking instructions (e.g., product description, quantity, location on a bin), and arranging instructions (e.g., arranging the product in a tote on the autonomous robots 106 or on the autonomous robot 106 itself). The analytics server may display instructions on a screen of the autonomous robot 106, audibly from the autonomous robot 106, using a light bar on the autonomous robot 106, on a screen of a picker device separate from the autonomous robot 106, audibly from the picker device separate from the autonomous robot 106, or other communication channel.

The analytics server 122 may also send instructions to pickers 112. In one example, the pickers 112 may use a device, such as a mobile phone, personal data assistant, handheld scanner, or a tablet computer. In another example, pickers 112 may wear wearable tech (e.g., earpieces, glasses, watches, wrist computer) configured to receive instructions from the analytics server 122. In other embodiments, the autonomous robots 106 receive instructions from the analytics server 122 and transmit the instructions to the workers 112.

The analytics server 122 may receive orders from devices 108. Based on the received orders, the analytics server 122 may generate pick lists. The analytics server 122 uses the one or more orders to generate one or more pick lists to be fulfilled by one or more autonomous robots 106 and workers 112 assigned to autonomous robots 106. The analytics server 122 may decompose the orders into pick lists based on the capacity of the autonomous robot 106 and/or the capacity of each of the totes on the autonomous robot 106.

In one configuration, the analytics server 122 may generate pick lists for each available autonomous robot 106 periodically. For instance, every fifteen minutes, the analytics server may aggregate the orders from each of the devices 108 and maximize the pick rate of each worker 112 by optimizing each tote on each autonomous robot 106. Some customers may indicate a pick purity such that the products in the customer's order are picked separately from and not mixed with other orders. In these cases, the analytics server 122 will not aggregate the products from multiple orders in an autonomous robot 106 or tote and simply arrange the products in the order optimally in one or more autonomous robots 106.

II. Autonomous Robots

Pickers may pick products from bins or shelves in a warehouse or other storage facility and load the products on an autonomous robot. The pickers described herein are human workers, though, in some implementations, it may be that the system can be configured for robotics to replace or assist the pickers. In some implementations, the autonomous robot may be robotic and move autonomously throughout the warehouse or storage facility. When moving autonomously, the autonomous robot can move along with a picker or independently of a picker to locations in the warehouse. In other implementations, the autonomous robot can pick items from bins or shelves and load the picked items onto the autonomous robot.

The pickers may load the products directly on the autonomous robot or into totes on the autonomous robot. A picker may enter a warehouse and pick products in the warehouse until an order is completed or until the autonomous robot is full (e.g., each of the totes on the autonomous robot are full). When the picker has completed a certain number of picks and/or the autonomous robot is full (up to a predetermined capacity), the picker may unload the autonomous robot by removing the products from the tote and/or autonomous robot. The picker may pick for more than one order at a time, as orders can be grouped together for more efficient processing.

The rate of speed that the pickers are able to pick products and load products on the tote is a pick rate. Pickers should spend time picking products rather than traveling from one pick to the next or being idle. Optimizing the pick rate includes increasing the density of the picks in the totes. In other words, optimizing the picks includes safely arranging the picks to minimize the available air space in the tote (or on the autonomous robot). In considering a volume of the tote, the optimization approach maximizes the amount of that volume occupied (or displaced) by picked products, which can allow more products to fit in the tote (e.g. during a clusterpick, the picker is able to fit three strollers into the tote rather than only two). The systems and methods described herein provide a path that allows a particular product arrangement in the tote.

Autonomous robots 106 are located in the warehouse 102 and controlled by the analytics server 122 via communications link 120. Pickers 112 work alongside the autonomous robots 106 to perform operations (e.g., pick products from bins 110 in the warehouse 102 and place those products in the autonomous robot 106). Although the example used herein describes an autonomous robot as being robotic and having autonomous operation based on instructions communicated from the analytics server 122, the subject matter of the present application may potentially be applied to scenarios involving carts that may be partially or completely manually operated by an operator (e.g., a picker), who may, for example, push, pull, drive, or otherwise move such a cart around the warehouse 102. For example, such a cart may have a shopping cart configuration. A manually-operated cart may still include components for communicating with the analytics server and the picker, such as a screen for communicating information to the picker 112 from the analytics server 122.

Figure 2A:
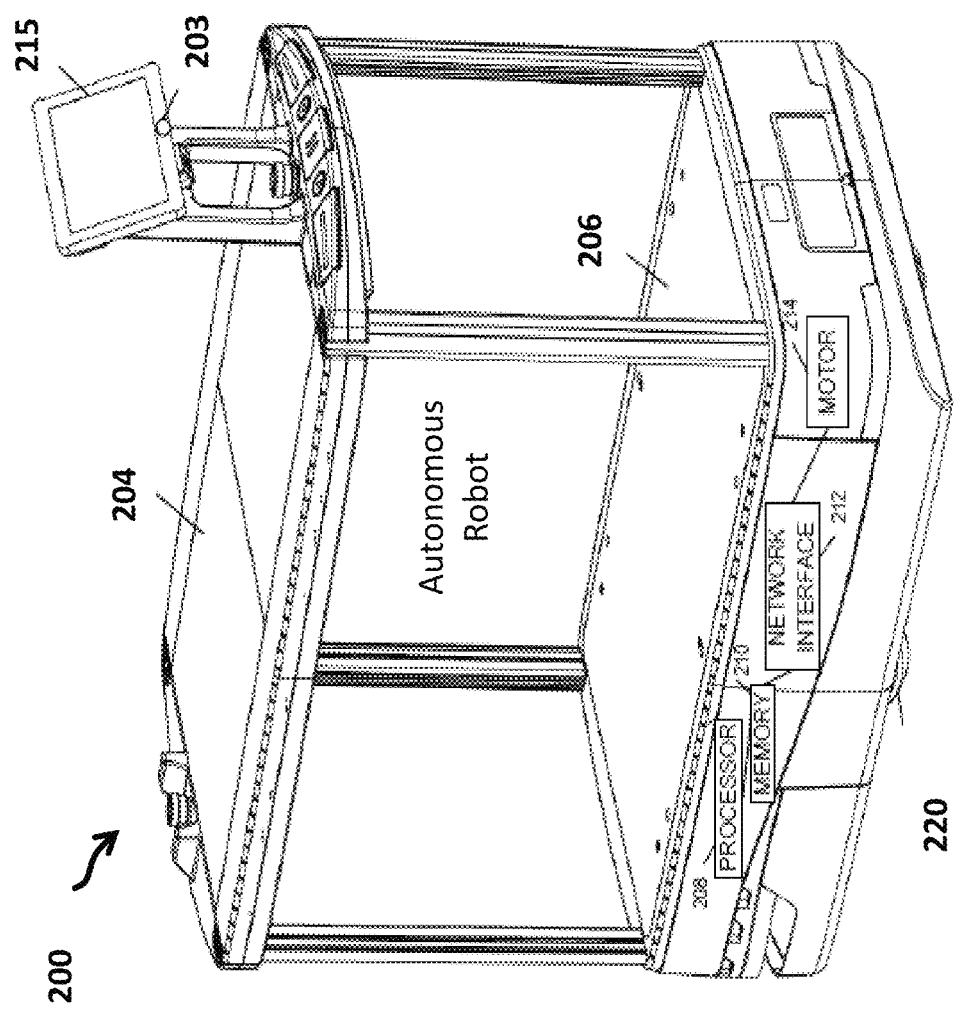
FIGS. 2A and 2B show an autonomous robot, according to an embodiment.

FIG. 2A shows an example autonomous robot 200, according to an embodiment. The autonomous robot 200 has two shelves 204 and 206. One or more totes (as described in FIG. 2B) can be, and sometimes are, transported on each of the shelves 204, 206 of the autonomous robot 200. The autonomous robot 200 includes a processor 208, memory 210, network interface 212, motor 214 and wheels 220 driven by the motor 214. The autonomous robot 200 also includes a user interface including display 215 and speaker 203. The network interface 212 is a wireless network interface capable of receiving commands and information from the analytics server and sending information, e.g., autonomous robot 200 location and pick information, to the analytics server via wireless signals. The memory 210 is used to store pick list and path information received from the analytics server. The pick list can include a number of totes to fit on the autonomous robot 200 and the products (and product arrangement) that the analytics server has determined to fit in each tote. The pick list can also include shelf/rack locations of each product in the warehouse, a product name, a product description, a product image, and a quantity of product to be picked by the picker and loaded into the autonomous robot 200 (or a particular tote on the autonomous robot 200). The pick information may also include an orientation of each product placed by the picker into the totes on the autonomous robot 200. The memory 210 also stores information used to prompt and guide the pickers to pick products as the autonomous robot 200 travels through the warehouse under the control of processor 208 and/or one or more processors in the analytics server.

The autonomous robot 200, through visual instructions displayed on display 215 and/or audio instructions provided via speaker 203, instructs the picker to pick particular products for an order and to place the products in one or more totes in a particular arrangement on the autonomous robot 200. The processor 208 in the autonomous robot 200 and/or the analytics server also controls the autonomous robot's 200 movement to/from one pick location to the next and/or to a meeting location when a handover is made to a new picker. In the event the autonomous robot 200 is handed over to a different worker (e.g., a worker at a packing station or a second picker taking over for the first picker), the autonomous robot 200 may require the different worker to log in to the autonomous robot 200 (e.g., via the touch screen 215) prior to the autonomous robot 200 providing guidance as to the next operation performed by the different worker.

While a two shelf autonomous robot embodiment is shown, multiple autonomous robot configurations are possible, with some autonomous robots being implemented using a single shelf while other autonomous robots have two or more shelves for carrying totes. Each of the totes on the autonomous robot may have several levels (layers, zones) for storing the picked products.

Figure 2B:
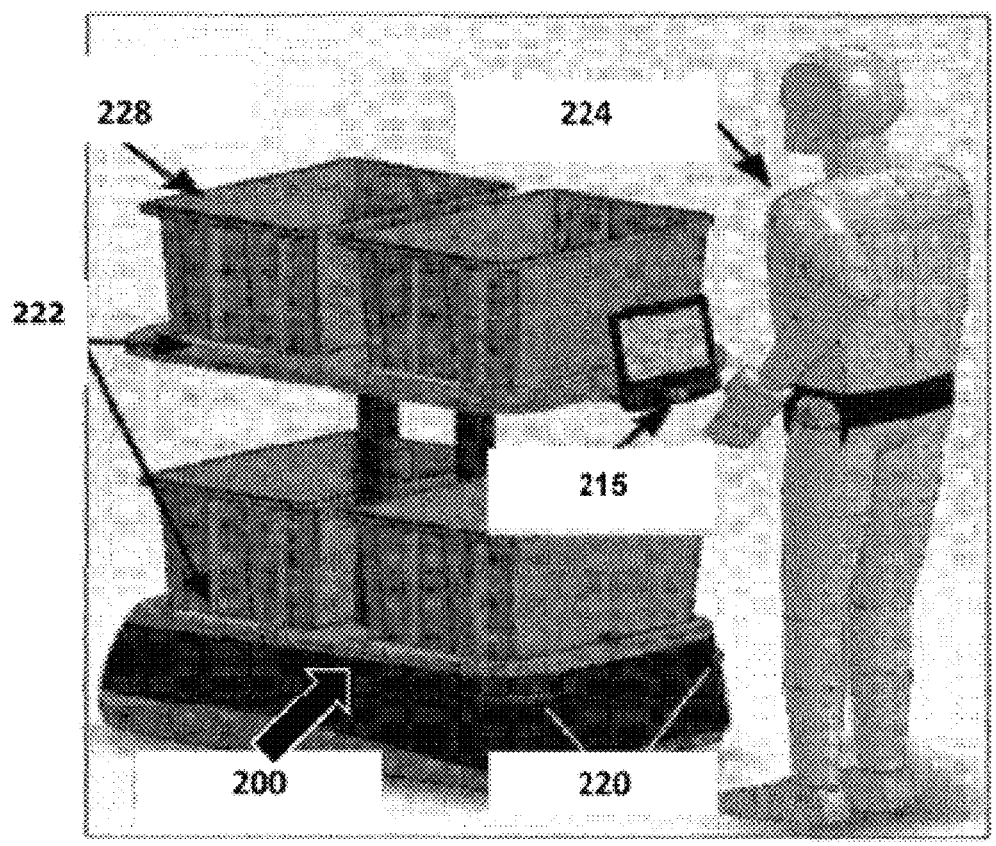

FIG. 2B shows the example autonomous robot 200 carrying totes 228, according to an embodiment. The autonomous robot 200 may display on screen 215 instructions for a picker 224. The instructions may instruct the picker 224 to place products in the totes 228. The picker 224 may place the product in a particular tote 228 based on lights 222, 220 indicating the particular tote. That is, the lights 222, 220 may illuminate, directing the picker 224 to place the product in the indicated tote 228. Additionally or alternatively, the display 215 may display instructions instructing the picker 224 which tote 228 to place the products. Further, the speaker (shown in FIG. 2A) may audibly instruct the picker 224 the proper product placement.

The display 215 and/or speaker may instruct the picker 224 to place the product directly on the autonomous robot 200. In such a scenario, the picker 224 may not load or operate the autonomous robot 200 with four totes 228. Rather, the picker 224 may load the autonomous robot 200 with two totes 228, for instance, and reserve space on the autonomous robot 200 for large or bulky products.

III. Illustrative Methods of Operation

Figure 3:
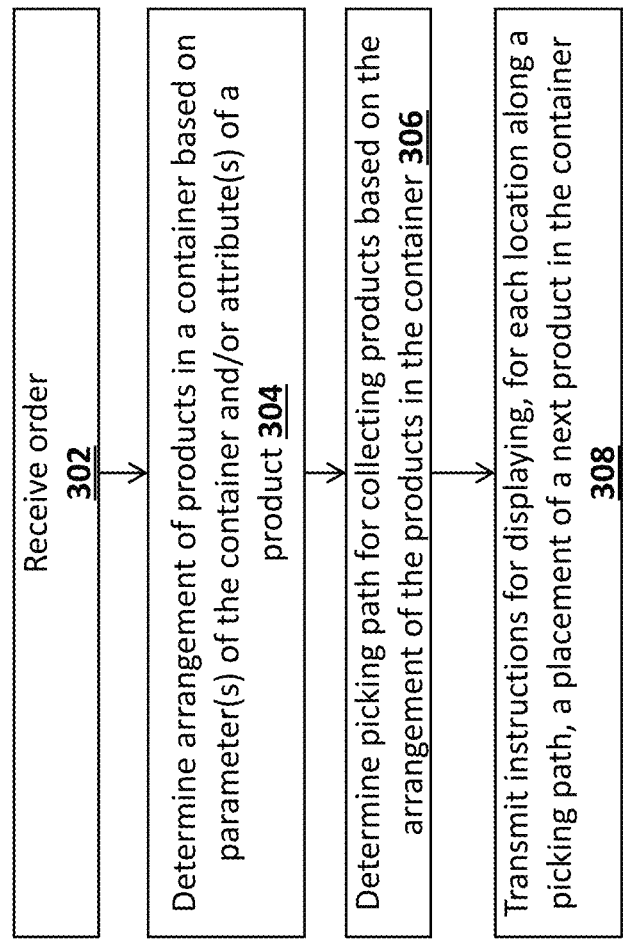
FIG. 3 shows execution steps of a method for determining and transmitting an optimal arrangement of products in a tote and a picking path, according to an embodiment.

FIG. 3 shows steps of executing a method 300 for determining and transmitting an optimal arrangement of products in a tote and a picking path by an analytics server, according to an embodiment. A customer device communicates with an analytics server (or other computing device) associated with a warehouse and the analytics server executes machine-readable software code for pick rate optimization. It should be appreciated that some embodiments may include additional, fewer, or different operations than those described in the method 300 and shown in FIG. 3. It should be further appreciated that the various operations of the method 300 may be performed by one or more processors executing on any number of computing devices.

In step 302, the analytics server receives an order containing a list of various products from a customer device. In some instances, the analytics server may optimally arrange the products in the order on an autonomous robot, or in one or more totes on the autonomous robot. In other instances, the analytics server may aggregate products of various orders and optimally arrange the products of various orders on the autonomous robot or in one or more totes on the autonomous robot.

The analytics server may also obtain attributes of the products in the order from user inputs or one or more servers/databases. The attributes can include the product's length, width, height, weight, orientation limitation, fragility and hazardous materials. The analytics server can calculate a volume of the product if it is not already listed as an attribute. The analytics server may determine whether any hazardous materials can be placed in a container with other products. The analytics server may determine that a hazardous material should be placed on top of another product, similar to the treatment of a fragile product. The analytics server may consider fragility of the product, including the weight that the product can bear or a crush weight. In the event the attributes do not include fragility (e.g., evaluation of the product's load points during, for instance, a first inspection), the analytics server can calculate fragility by estimating a weight-to-size product ratio. For example, a large, heavy product is not as likely as fragile as a large, light product. The attributes may also include a list of unit of measurement possibilities for the product (e.g. the product comes in: singles, 6-pack, or 24-pack), and corresponding dimensions for each unit of measurement. For instance, the long and flat 24-pack adds an extra 5 mm in every dimension, as compared to other units of measurement, to account for the cardboard packaging that keeps the twenty-four products together.

The analytics server may obtain the attributes of the products from memory. The analytics server may also obtain attributes of the product via workers in the warehouse, or using cameras/sensors/scales in communication with the analytics server. The analytics server may also obtain attributes of the product during an initial inspection of the product upon receipt of the product. For example, the analytics server may determine the attributes of the product from a scan of the product, captured using a camera on a mobile device held by a worker or using a camera on the ceiling of the warehouse. The analytics server may also obtain the attributes of the products from a user input or from vendors, third parties, or other warehouses via one or more servers/databases.

In step 304, the analytics server determines an arrangement of products in a tote (or other container) based on one or both of parameter(s) of the tote and/or attribute(s) of the product. For example, the analytics server may determine the arrangement of products in the tote based on the fragility of the product and/or one or more preferred orientations of the product.

In a different example, the analytics server may determine the arrangement of products in the tote based on a parameter of the tote such as packing density. In yet another example, the analytics server may determine the arrangement of the products in the tote based on the fragility of the product, the preferred orientations of the product, and the packing density of the tote.

Determining the arrangement of the products based on the tote's packing density, for instance, may include optimizing the packing density of the tote such that the arranged products in the tote result in the smallest available airspace of the tote. The analytics server may aim to optimize packing density by arranging the products in the tote to consume (or displace) most of the airspace in the tote such that the available airspace is minimized.

The parameters of the tote may also include constraints of the tote such as a total volume, a maximum weight capacity, a tote-fill limit, one or more physical tote dimensions, and unit count limits. The products arranged in the tote may not exceed the total volume of the tote and/or the physical tote dimensions. That is, the products arranged in the tote should fit safely within the boundaries of the tote. Local safety guidelines may dictate the maximum weight capacity of the tote. In an example, the ergonomic maximum weight capacity of the tote may be 40 lbs. In an example, the tote-fill limit describes a fill height from the top of the tote. In a different example, the tote-fill limit is based on a fill percentage of the tote. That is, the picker may fill the tote up to a certain fill percentage (e.g., the volume of the products in the tote may consume 80% of the tote's total volume). Unit count constraints may prohibit the picker from adding more than a certain number of products (units) to the tote. One or more users, supervisors, customers, or regulatory entities may set constraints on the tote.

Arranging the Products in the Tote According to Tote Parameters and/or Product Attributes The analytics server has an algorithm that models (or simulates) the arrangement of products in the tote based on one or both of parameter(s) of the tote and/or attribute(s) of the product. The analytics server may model the tote using levels. For example, a tote may have a bottom level, a middle level, and a top level. In some implementations, the analytics server models the tote using a 3D model of the tote. In other implementations, the analytics server models the tote using one or more shapes and/or one or more combinations of various shapes. Similarly, the analytics server may model a product using a 3D model of the product, one or more shapes and/or one or more combinations of various shapes.

An optimal arrangement may represent a modeled tote with an optimized packing density (e.g., the minimum amount of remaining air space in the tote once the tote contains the products). In some configurations, the analytics server may determine a particular placement of the product within a tote (e.g., place the product in a certain corner or place the product on top of a previously-placed product). In other configurations, the analytics server may determine a particular placement of the product directly on the autonomous robot rather than in the tote, particularly for oddly shaped products or large products. In some cases, the analytics server may reserve space for the product on the autonomous robot instead of using the space on the autonomous robot for a tote.

Figure 5:
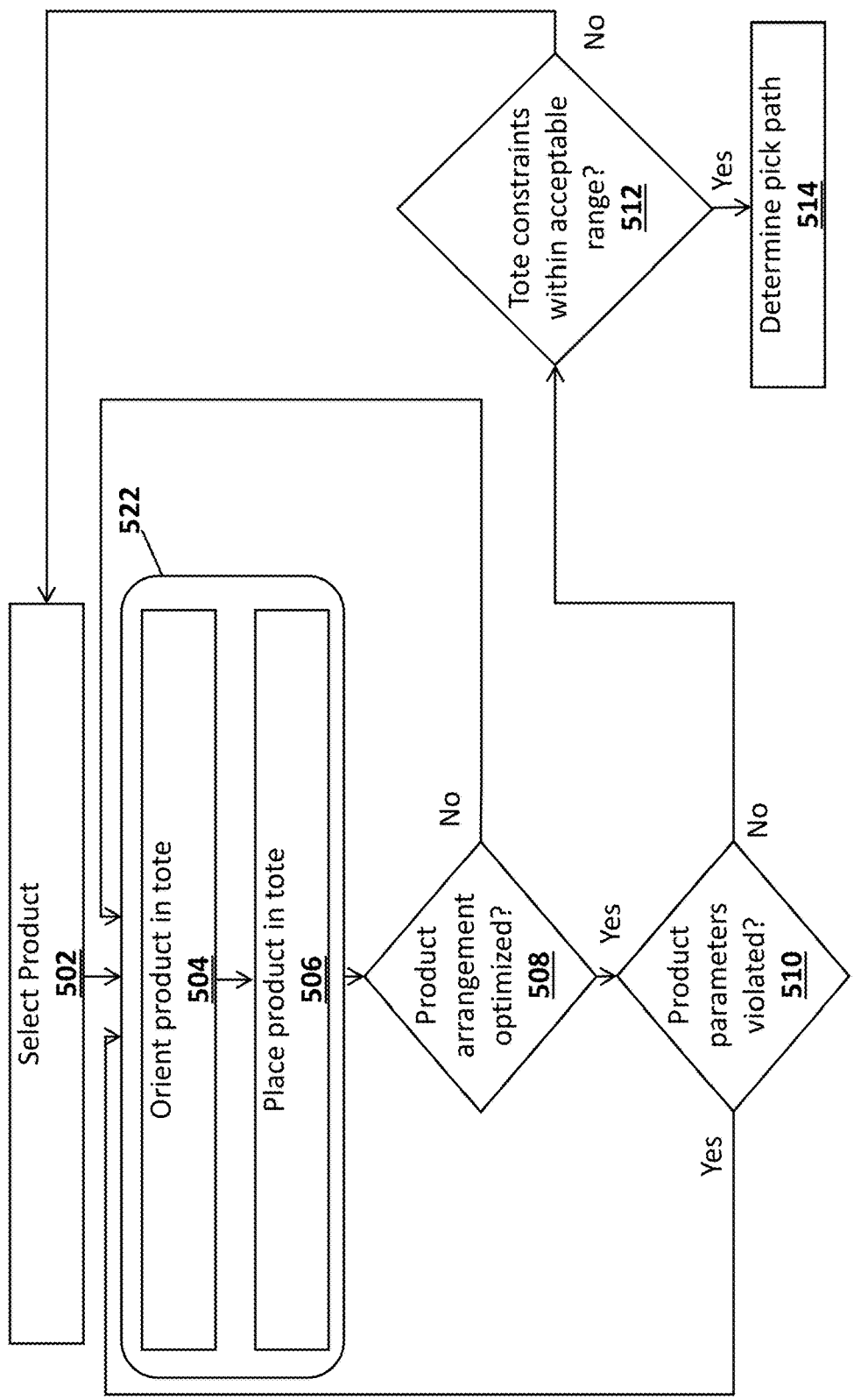
FIG. 5 shows execution steps of a method for arranging a product in a tote, according to an embodiment.

FIG. 5 shows steps of executing a method 500 for arranging a product in a tote, according to an embodiment. It should be appreciated that some embodiments may include additional, fewer, or different operations than those described in the method 500 and shown in FIG. 5. It should be further appreciated that the various operations of the method 500 may be performed by one or more processors executing on any number of computing devices. In some embodiments, the analytics server may execute method 500 upon determining one or more criteria (or thresholds) have been satisfied, such as a determination that the product has smaller dimensions than the container.

In step 502, the analytics server selects a product out of a plurality of products. The plurality of products may be a pool of products based on products requiring picking or a pool or products that have satisfied one or more criteria (e.g., products to be picked on a particular day, products to be picked in a particular autonomous robot/tote, products to be picked by a particular picker, products that are known to fit in a particular autonomous robot/tote, and the like). For instance, the analytics server may add products to the plurality of products based on received orders from customer devices. The analytics server may select the product from the plurality of products randomly, pseudorandomly, according to one or more criteria, or according to a sequence. For example, a product may be required for picking, but one or more product criterion and/or tote criterion may not be satisfied. For instance, the product may be too heavy to fit in the tote (or autonomous robot), the product may be too large to fit in the tote (or autonomous robot), and the like. Some products may have multiple quantities. For example, a customer may order two gallons of milk. In some implementations, given products with multiple quantities, the analytics server may select the quantities of the product consecutively. That is, the analytics server will determine the arrangement for the first gallon of milk in the tote and subsequently select the second gallon of milk and determine the arrangement of the second gallon of milk in the tote.

In some implementations, the analytics server may create multiple pools of products. For instance, a customer may request that the customer's products be picked separately from other customers' products. In these cases, the analytics server may create a product pool based on that customer's products and select products only from that pool of products. Additionally or alternatively, the analytics server may create pools of products periodically and prioritize selecting products from the pools of products created earlier in time such that products associated with orders placed earlier in time are prioritized over products associated with orders placed later in time.

In some implementations, the pool of products may be a pool of products that have been previously arranged in the tote. For example, the analytics server may determine that one or more tote constraints are exceeded (e.g., decision 512). For instance, the notionally arranged products in the tote may exceed the tote weight limit. In one implementation, the analytics server may create a pool of products based on the products that have been optimally arranged in the tote but exceed the weight limit and re-arrange the products in the tote using the number of products in the pool minus one product. The analytics server may re-determine whether the newly arranged products in the tote exceed one or more tote constraints. In the event the products arranged in tote still exceed one or more tote constraints (e.g., tote weight limit), the analytics server may re-arrange the same products in the tote using the same number of products minus two products. The analytics server may place products removed from the tote into one or more pools of products. In other implementations, the analytics server does not create a pool of products based on the products that were optimally arranged in the tote and instead refills the tote with products from one or more pools.

Process 522 describes arranging the product in the tote. Arranging the product in the tote involves both orienting the product in the tote and placing the product in the tote. The analytics server may model various combinations of products arranged in the tote and various orientations of products arranged in the tote. The analytics server iterates this simulation process of conceptually packing the products in the tote in different orders and configurations to determine an optimal arrangement and orientation for products in the tote based on a smallest remaining volume of the tote. As a product is placed into the tote, the analytics server calculates a remaining volume and dimensions in the tote to determine placement of additional products. In some implementations, autonomous robots may contain one or more totes. In the event the selected product does not fit in the tote (e.g., exceeds one or more product and/or tote constraint), the analytics server may allocate the product to a different tote on the same autonomous robot according to the totes associated with the autonomous robot.

In step 504, the analytics server notionally orients the product in the tote. Orienting the product in the tote involves rotating the product such that the analytics server may notionally place the product on a side or on the top/bottom of the product. For example, the analytics server may orient a product that is modeled to have an aspect ratio of 5:2:4 on its side such that the product's width of two inches is notionally placed in the tote.

In step 506, the analytics server notionally places the selected product in the tote according to the orientation determined from step 504. The analytics server may notionally place the selected product in the tote by modeling, or otherwise simulating, the product placed in the tote. The analytics server may place the product along the side of the tote, on top of other products in the tote, in the middle of the tote, diagonally across the tote, and the like. In one configuration, the analytics server may place an initial product in a corner of a tote and then fill the remainder of the tote. In another configuration, the analytics server may place an initial product along an edge of the tote and then fill the remainder of the tote. In yet another configuration, the analytics server may place an initial product in a central area of the tote. A subsequently-placed product may be placed on top of or adjacent to a previously-placed product. Alternatively, a subsequently-placed product may be placed in the tote away (e.g., in a different corner or along a different edge) from the previously-placed product with space therebetween.

In decision 508, the analytics server determines whether the arranged product is optimized in the tote (or in the level of the tote). The analytics server may optimally arrange a next product in the tote given the remaining volume based on the arranged product in the tote. Because the tote does not likely retain the same aspect ratio of length:width:height of the remaining volume, the algorithm calculates where the product is located in the tote to calculate a remaining volume.

The analytics server may store the orientation of the product in the tote, the placement of the product in the tote, and the remaining volume of the tote given the arranged product in the tote. Using the same product, the analytics server may arrange the product in the tote differently to compare the aspect ratios of the remaining volumes of the tote and determine the optimal arrangement of the product in the tote. That is, the analytics server may modify the orientation of the product in the tote and/or the placement of the product in the tote.

Figure 4A:
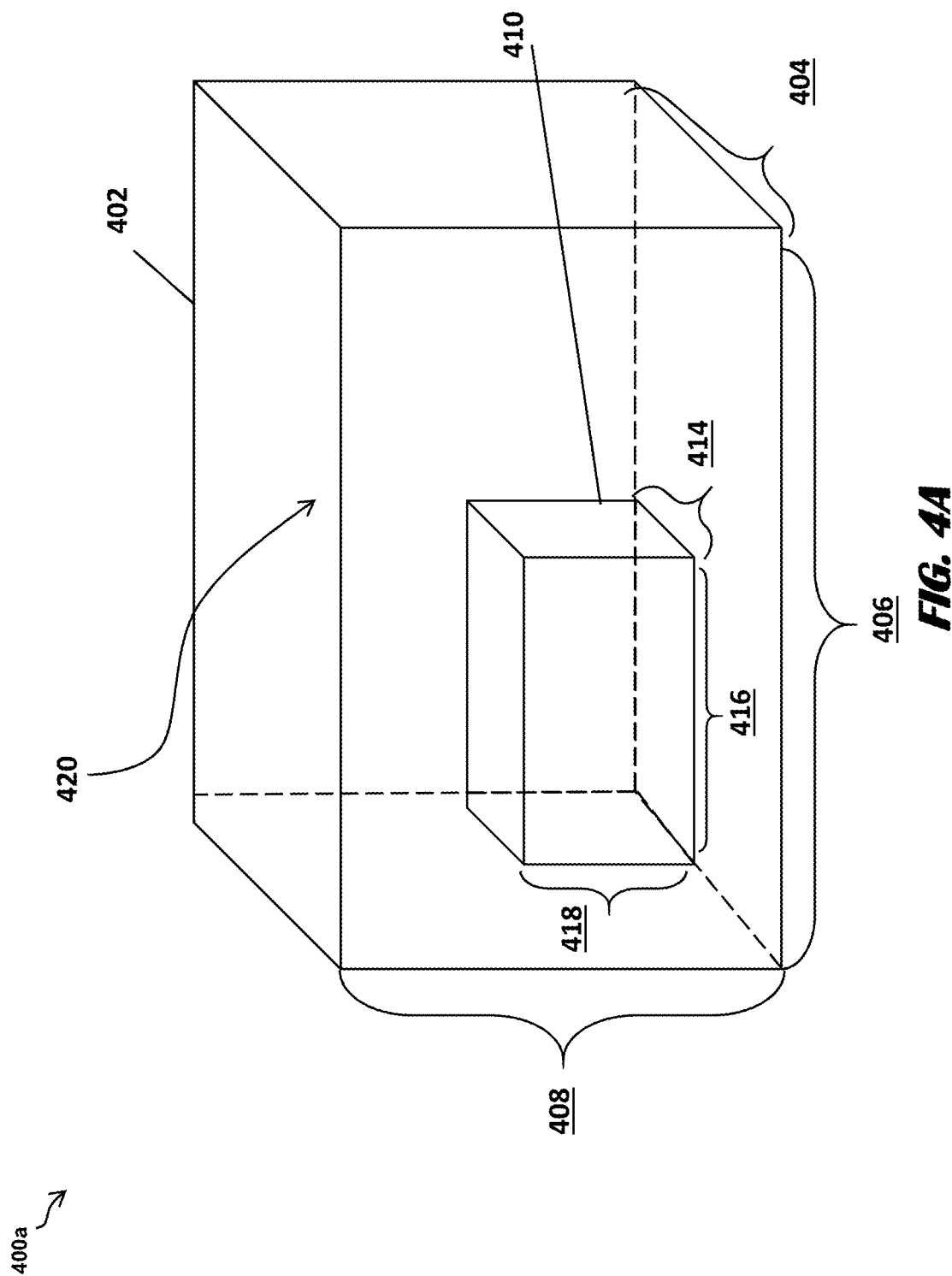
FIGS. 4A-4D show a tote having levels and filled with products, according to an embodiment.

FIG. 4A shows an example 400a of a remaining volume 420, according to an embodiment. The analytics server may obtain the attributes of a tote 402 and/or attributes of the product from one or more user inputs or one or more servers/databases. The tote 402 may be modeled for purposes of volume calculations as a rectangle defined by a length 406, a height 408, and a depth 404. A product 410 may be modeled for purposes of volume calculations as a rectangle defined by a length 416, a height 418, and a depth 414.

The analytics server may notionally place the product 410 in the tote 402, decreasing the available remaining volume 420 of the tote. The analytics server determines the optimal arrangement of products in the tote based on minimizing the available remaining volume 420. For example, when a product A is placed in a tote having a volume V, the remaining volume is $V-V_A$. However, because of the dimensions of product A, the dimensions of the remaining volume do not necessarily retain the length, height, or depth of the tote. As a result, the analytics server considers the remaining volume and dimensions for placement of additional items in the tote. Each iteration of simulating the placement of products in the tote may vary the order of the products placed, the orientation of the products placed, and the location in the tote for each product.

Figure 4B:
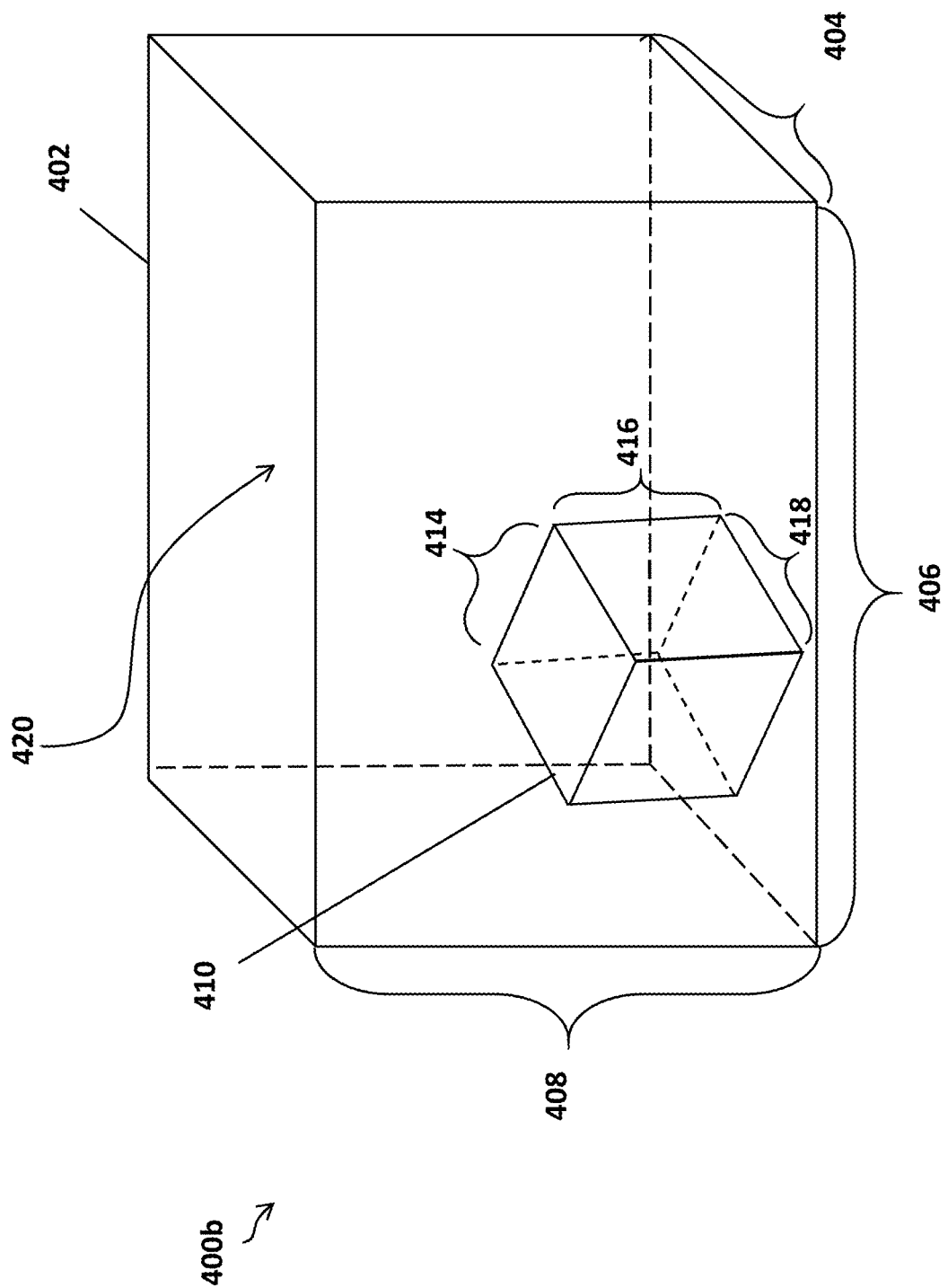

FIG. 4B is an alternate embodiment of FIG. 4A. Example 400b depicts the analytics server notionally orienting the product 410 in the tote 402 differently than the orientation of the product 410 in the tote 402 in FIG. 4A. The analytics server notionally places the product 410 on its side in FIG. 4B. While the available remaining volume 420 in FIG. 4B is the same as the available remaining volume 420 in FIG. 4A because the volume of the product 410 and the volume of the tote 402 are the same, the aspect ratio of the length:width:height of the remaining volume of the tote 402 has changed from FIG. 4A to FIG. 4B. The analytics server may determine the new aspect ratio of the length:width:height of the remaining volume 420 of the tote given the modified orientation of the product 410 positioned in the tote 402.

Figure 4C:
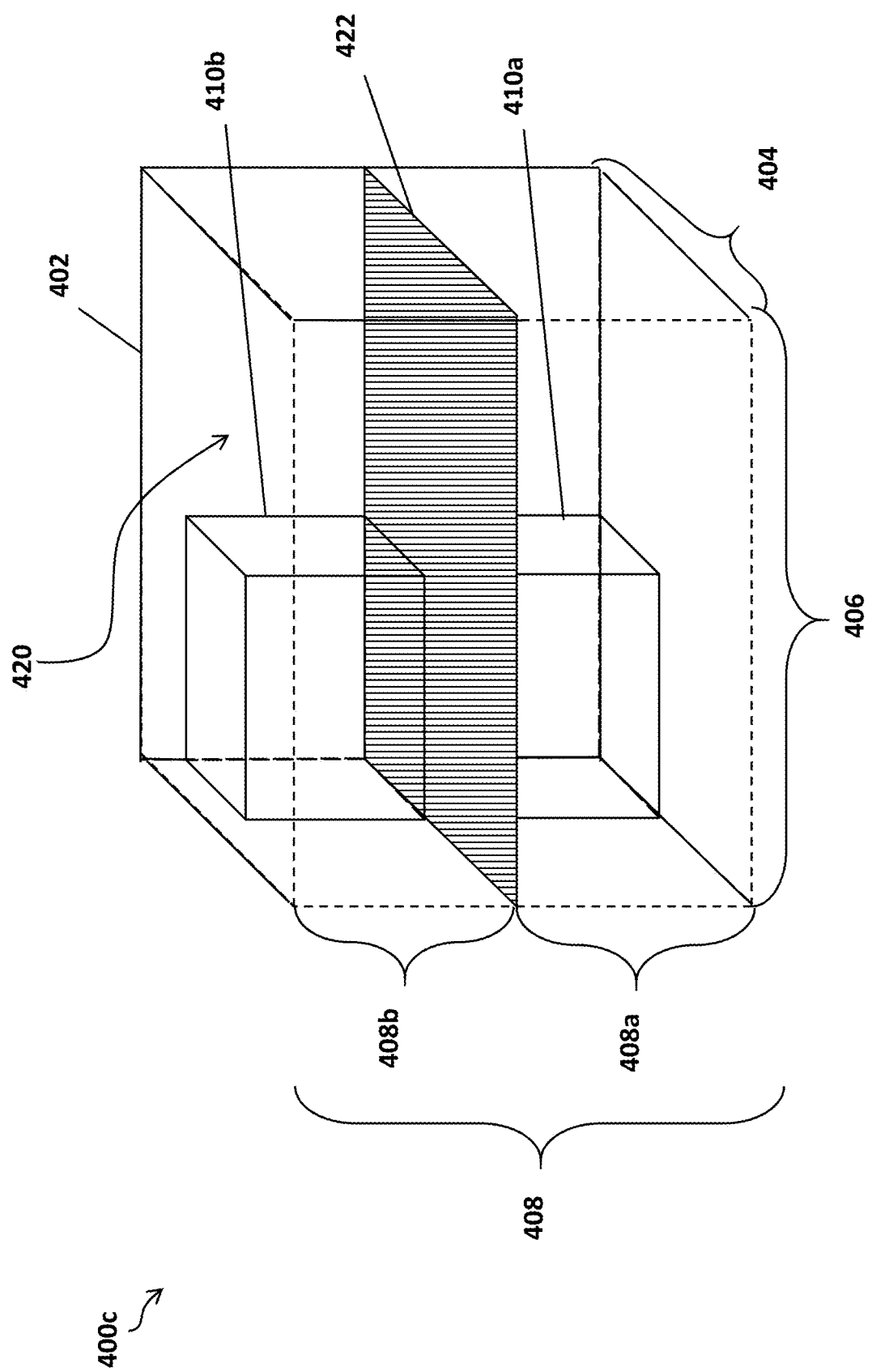

FIG. 4C shows an example 400c of the tote 402 with a level 422 (may also be referred to as layer). Levels may be portioned into one or more zones (not shown). In some embodiments, the level 422 is a physical level. A picker may place products such as product 410a in the tote 402 and subsequently place level 422 on top of the products such as product 410a. Level 422 may rest on products such as product 410a. Additionally or alternatively, the picker (or vendor) may affix level 422 to the tote 402 using temporary clips or other holders. Additionally or alternatively, the picker (or vendor) may attach level 422 using a hinge and/or collapsible cover to the tote 402. The picker may move the attached level 422 such that products like product 410a can be placed by a picker beneath level 422. Level 422 may also be a non-physical layer. That is, products such as product 410b may be placed directly on top of product 410a, creating "layers" of products on one another. The level 422 may modify the remaining volume of the tote 402. For instance, the total height of the tote 408 becomes the height of the tote 408a beneath level 422 and the height of the tote above 408b level 422. Accordingly, the aspect ratios of the length:width:height of the remaining volume 420 of the tote changes based on the level 422 and the placement of products in the tote with the level 422.

Figure 4D:
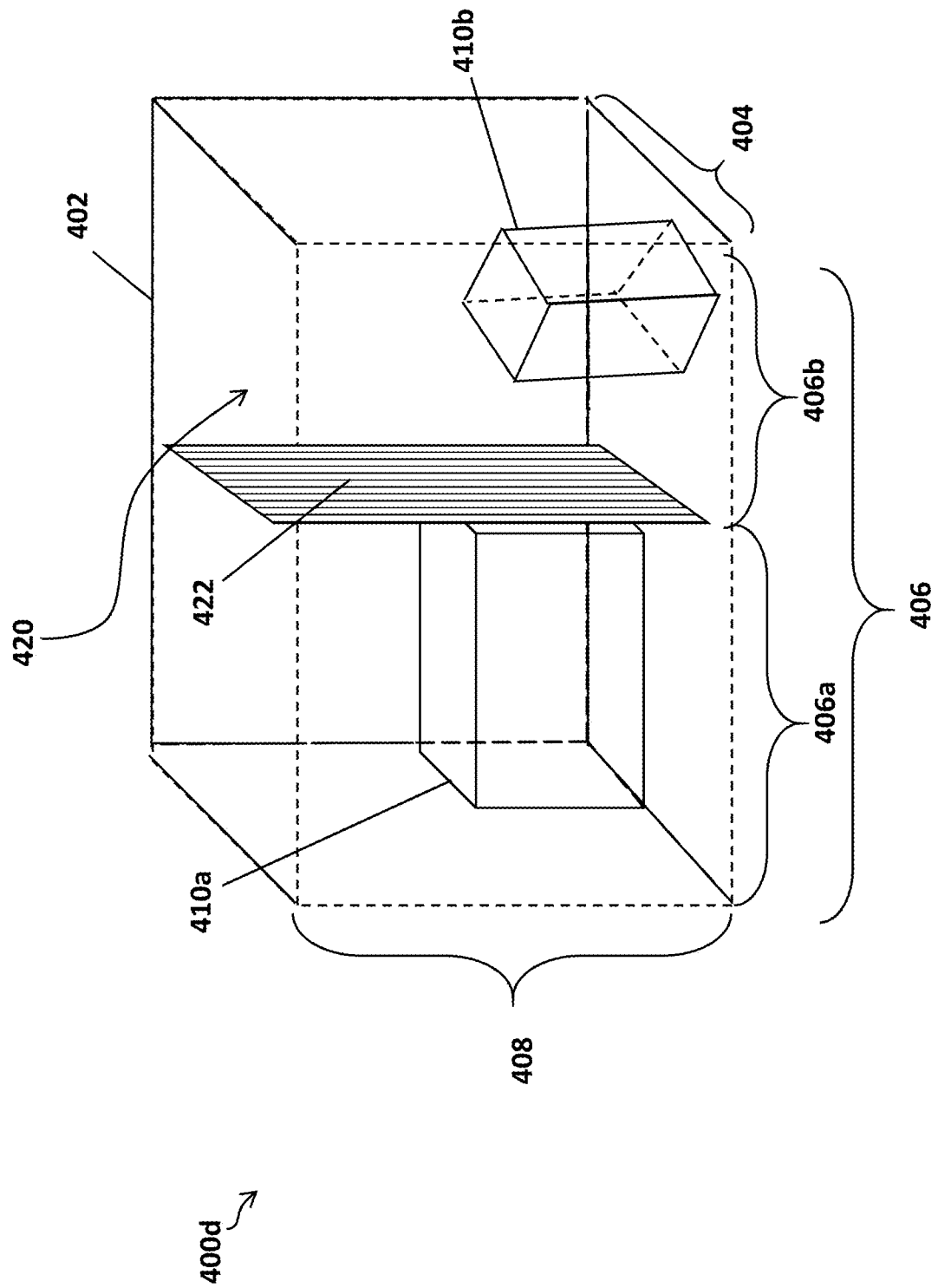

FIG. 4D is an alternate embodiment of FIG. 4C. Example 400d depicts the tote 402 with layer 422 dividing the length of the tote 406 into a length 406a and a length 406b. Based on volume, fragility, and/or weight, the analytics server may assign a position of the product in an appropriate level and/or zone. For instance, the analytics server may optimally arrange fragile products (e.g., product 410a) in the tote 406 using level 422 as a divider between the fragile products 410a and non-fragile products (e.g., product 410b). Accordingly, the aspect ratios of the length:width:height of the remaining volume 420 of the tote changes based on the level 422 and the placement of products in the tote with the level 422.

The analytics server may iteratively calculate and store aspect ratios of length:width:height of the remaining volume of the tote given various orientations and placements of the product in the tote. The analytics server may iteratively compare one or more previous aspect ratios of the remaining volume of the tote to the remaining volume of the tote based on the newly arranged product. The analytics server may determine a best arrangement of the product in the tote based on the largest aspect ratio of the compared remaining volumes of the tote (minimizing the available airspace in the tote).

The analytics server may iteratively store, arrange, and evaluate the aspect ratio of the remaining volume of the tote for a predetermined number of iterations. One or more users (supervisors) may predetermine the number of product orientations and placements in the tote. The number of iterations may change depending on the product. For example, a gallon of milk may be arranged such that it is placed in the tote on a side of the gallon of milk or on the bottom of the gallon of milk. Thus, for gallons of milk, the predetermined number of iterations may be two.

In some implementations, for each iteration, the analytics server may orient and/or place the product according to predetermined orientations and/or placements. For example, during the first iteration, the analytics server may orient the product on a side. During the second iteration, the analytics server may orient the product on the bottom of the product. Each iteration, the analytics server compares one or more aspect ratios of the remaining volume of the tote to the current aspect ratio of the remaining volume of the tote. The analytics server may determine the best arrangement of the product in the tote based on the largest aspect ratio of the remaining volume of the tote.

The analytics server may optimize the product arrangement in the tote by picking particular units of measurement, or size and/or quantity variants of each product, such that the picked products better fill the tote (e.g., reduce the amount of available airspace in the tote). Optimizing the products placed in each tote can result in fewer totes necessary to pick products. Accordingly, more totes are available. Pickers can fill more totes with more products when completing orders in the warehouse or other storage facility, thereby increasing the pick rate.

The analytics server may communicate with a database and/or server to receive an updated inventory of products in the warehouse. The warehouse may store the products in various sizes or quantities, so the inventory data may include the available units of measurement for each product. A size variant product identifier may identify the units of measurement for each product. For example, a 12-pack of Coke may be Coke-12. In contrast, a 6-pack of Coke may be Coke-6. The analytics server obtains (from the database, user input, sensors, and/or cameras) the dimensions of the various sizes of the product.

When the analytics server determines the arrangement of products in the tote, the analytics server may consider conversions of the units of measurement available for the products. Customers may indicate in the order whether they would accept different size variants of the product. For example, if the customer requests the 12-pack of Coke, the analytics server may model the 12-pack of Coke in the tote, two 6-packs of Coke in the tote, and twelve individual Cokes in the tote. In the event the analytics server determines that two 6-packs of Coke would more optimally fit in the tote given the other products in the tote, the analytics server substitutes the two 6pack variant of the product to fill the order instead of the one 12-pack variant. The analytics server may communicate with the database and/or server to decrement the number of 6-packs of Coke from the inventory data.

The analytics server may record and/or track the products (and the units of measurement for the products) in the warehouse inventory, or communicate with one or more databases and/or servers. The analytics server may also create available units of measurement by decomposing units of measurement. For example, the analytics server may determine that there are no available individual bottles of Coke, however, numerous 6-packs of Coke may be available. The analytics server may instruct the picker to break open a 6-pack of Coke and pick individual bottles of Coke from the 6-pack of Coke to satisfy an order or to optimize the arrangement of products in an order.

The analytics server may modify the available inventory of the warehouse (or communicate with the database and/or server to modify the available inventory of the warehouse). In some configurations, the analytics server may modify the available inventory of the warehouse upon determining the optimal arrangement of products in the tote. Additionally or alternatively, the analytics server may modify the available inventory of the warehouse responsive to the analytics server determining that the product has been placed in the tote. For instance, the analytics server may determine that the product has been placed in the tote when the picker indicates that the product has been placed in the tote. For instance, the picker, after being instructed to decompose a unit of measurement (e.g., a 6-pack of Coke) into a smaller unit of measurement (e.g., individual "eaches" (e.g., single cans or bottles) of Coke), may place a quantity of eaches in the tote. For example, the picker may pick four single cans of Coke from the six single cans of Coke created from breaking down a 6-pack of Coke. In response, the analytics server may decrement the available number of larger units of measurement (e.g., a 6-pack of Coke) and increment the available smaller units of measurement (e.g., two individual cans of Coke resulting from the remaining cans of Coke from the decomposed 6-pack of Coke). In other words, if the picker is instructed to open the 6-pack and pick four cans of Coke, the analytics server may increment the number of individual eaches of Coke by two and decrement the 6-pack inventory by one when the picker indicates that the picker has placed the four cans of Coke in the tote. Additionally or alternatively, the analytics server may determine that the product has been placed in the tote when the analytics server provides directions to the next product.

Referring back to FIG. 5, the analytics server, in decision 510, determines whether one or more product attributes have been violated. Product attributes may include product orientation. Several products may mathematically appear to fit in a remaining volume of the tote, however in reality, a characteristic of the product may constrain the product orientation. When limiting the product based on a realistic orientation of the product in the tote, the product may not fit in the remaining volume of the tote. Another product attribute includes product fragility. For example, the analytics server should notionally place fragile products at the top of the tote such that the fragile product is not crushed. Another product attribute includes product weight. For example, the analytics server should notionally place heavy products at the bottom of the tote, and notionally place light products at the top of the tote. In other words, the product attributes may dictate the ordering of products in the tote, where the lower levels of the tote are filled before filling the top levels of the tote.

The analytics server may determine a violation of a product attribute by comparing the product orientation limitations with the orientation of the product (e.g., oriented in step 504). For instance, the product orientation limitation attribute may limit the orientation of the product. The analytics server should not arrange the product according to the limitation of the product orientation parameter. For example, a gallon of milk should not be arranged such that the gallon of milk rests all of its weight at the cap of the gallon of milk. In the event the analytics server has oriented the product in a manner consistent with the product orientation limitation, the analytics server may rearrange the product according to process 522.

Additionally or alternatively, the analytics server may determine a violation of a product attribute by evaluating the fragility of the product with respect to the placement of the product (e.g., placed in step 506). For instance, the fragility of the product may limit the product from being placed beneath one or more products. In the event the analytics server has placed the product in a manner consistent with the limitation of the product fragility, the analytics server may rearrange the product according to process 522.

In decision 512, the analytics server determines whether the tote constraints are within an acceptable range. A user may set one or more acceptable ranges for each tote constraint.

A tote constraint may be the maximum weight limit. A user may determine that an acceptable weight limit is 35 lbs, but that any weight over 40 lbs is unacceptable. The analytics server may evaluate the weight of the tote by summing the weight of the products notionally arranged in the tote and comparing the weight of the products arranged in the tote to a range of an acceptable tote weight capacity (e.g., between 35-40 lbs). In the event the tote weight is within the tote weight capacity, the analytics server may proceed to step 514 and determine the pick path based on the notionally arranged products in the tote. In contrast, if the tote weight is not within the acceptable range of the tote weight capacity (e.g., less than 35 lbs or over 40 lbs), the analytics server may select a product from step 502. The analytics server may determine whether the tote weight is above the acceptable range of the tote weight capacity or below the acceptable range of the tote weight capacity. To increase the weight of the tote, (e.g., the tote weighs 15 lbs but needs to weigh at least 35 lbs) the analytics server may select a product from any one or more product pools in step 502. In some implementations, to decrease the weight of the tote (e.g., the tote weighs 41 lbs but needs to weigh less than 40 lbs), the analytics server may create a product pool based on the products notionally arranged in the tote and rearrange the products in the tote using the number of products in the product pool minus one (as discussed in step 502). In other implementations, to decrease the weight of the tote, the analytics server may remove a product from the tote.

A tote constraint may be the tote-fill limit. A user may determine an acceptable tote-fill limit. For example, the user may set the tote-fill limit to 80%, indicating that the tote that is at least 80% full is satisfactorily full. The analytics server's algorithm may perform a liquid filling analysis in determining whether the tote-fill limit is within an acceptable range. The algorithm may use the volume of each of the products and the total volume (or the remaining volume) of the one or more totes in evaluating the tote-fill limit. For example, as products are added to the tote, the analytics server may compute the remaining volume of the tote by subtracting the volume of the placed products from the total volume of the tote. The analytics server may compare the remaining volume of the tote to the total volume of the tote to determine the tote-fill percentage. The analytics server may also compare the total volume of the tote to the total volume of various products notionally placed inside of the tote to determine the tote-fill percentage. In the event the tote fill-limit is not within an acceptable range (e.g., the tote fill limit is at 50% when the tote should be full to at least 80%) the analytics server may select a next product in step 502 to decrease the remaining volume of the tote. In the event that the tote constraints are within the acceptable range the analytics server may determine a pick path at step 514 based on the arrangement of products in the tote.

A constraint of the tote may be the dimensions of the tote. The analytics server may perform a maximum dimension analysis to determine whether one or more products may be notionally arranged in the tote. For example, the maximum dimension analysis compares a longest side of the product to a longest side of the tote or to a longest side of a remaining side of the tote after other products have been arranged therein. If the longest side of the product is smaller than the longest side of the tote or to the longest side of the remaining side of the tote after other products have been placed therein, then the analytics server may determine that the product fits within the tote.

Additionally or alternatively, the analytics server may compare a longest height of the product to the longest height of the tote or to a longest height of the remaining height of the tote after other products have been placed therein. The analytics server may determine that the product fits within the tote if the longest side of the product and the longest height of the product fit within the tote (e.g., these dimensions are smaller than the longest side of the tote and the longest height of the tote). Further, the analytics server may compare a longest width of the product to the longest width of the tote or to a longest width of the remaining width of the tote after other products have been placed therein. The analytics server may determine that the product fits within the tote if the longest width of the product, the longest side of the product, and the longest height of the product fit within the tote (e.g., these dimensions are smaller than the longest side of the tote, the longest height of the tote, and the longest width of the tote). In modeling the remaining volume of the tote, the analytics server will dynamically adjust the longest dimensions of the tote.

The algorithm may optimize the arrangement of products in the tote based on a combination of tote parameters and product attributes. For instance, the algorithm may optimize the arrangement of products in the tote based on the tote packing density parameter, the tote weight capacity parameter, and various product attributes (e.g., product weight). In an example, the algorithm may notionally add and remove products to the tote, iteratively determining the available airspace and weight limit. In a different example, the algorithm may optimize the available airspace of the tote based on an orientation and arrangement of products within the tote and subsequently determine the weight of the tote. Responsive to removing one or more products, the analytics server may re-evaluate, in real time or near real time, the arrangement of the tote by reconsidering the combinations of products in the tote that result in the smallest available airspace of the tote. The analytics server continues to iterate this process until the optimal arrangement is achieved and the product attributes and tote constraints are acceptable.

Directing Pickers on a Pick Path to Pick Products Based on the Arrangement of the Products in the Tote Referring back to FIG. 3, in step 306, the analytics server may determine the pick path for collecting products. The analytics server determines the pick path based on the modeled arrangement of the products in the tote. The pick path represents the order in which a picker should obtain the products to place those products in the tote according to the modeled arrangement. The analytics server may first direct pickers to locations of products that should be placed at the bottom of the tote. The analytics server may then direct pickers to subsequent product locations such that products are placed at the bottom of the tote to the top of the tote. In some configurations, the analytics server may consider the proximity of products in the warehouse. That is, the proximity of the product exceeding a threshold may modify the pick path based on the product arrangement in the tote.

In some implementations, the analytics server may determine the pick path for each tote on the autonomous robot, one tote at a time. In other implementations, the analytics server may determine the pick path for some or all of the totes on the autonomous robot using the arrangement of the products across the totes on the autonomous robot. That is, the analytics server will determine a pick path that fills the bottom level of all of the totes on the autonomous robot, and then the next level, and the like. Some totes may have various levels and zones in each of the levels. Other totes may not have levels and/or zones.

The analytics server may display the pick path directions and/or product arrangement instructions using augmented reality (AR). AR is a computer generated perceptual information supplementing a person's perception of their real world environment. Rather than the picker looking at the screen, the picker may wear a headset (or glasses) that show the real world environment supplemented by AR. Additionally or alternatively, the autonomous robot may have a camera and/or one or more totes may have cameras such that the analytics server may use the cameras to obtain images and/or video of the autonomous robot and/or tote. The autonomous robot may also have a projector and/or one or more totes may have projectors such that the analytics server may display AR instructions on the autonomous robot and/or tote.

For example, a product, which is not physically in an area, may appear in the given area. The analytics server may overlay a virtual object in the physical world by obtaining (e.g., using a camera) physical world images, set of images, or videos (in a compressed or uncompressed state) of the warehouse (e.g., shelves and bins, map of the warehouse), the tote, the autonomous robot, or a current state of the picker's environment (e.g., what the picker is observing). The analytics server may define a coordinate system using features from the obtained physical world data (images, sets of images, videos). For example, the analytics server may detect edges and other planar surfaces. The analytics server may use the 3D feature data (coordinate system) derived from the physical world data, to size, align, and orient, one or more virtual objects, The analytics server may obtain (retrieve or create) the virtual objects corresponding to products in the warehouse according to stored 3D virtual objects of products in a library, or requested 3D virtual objects from one or more vendors, databases, and servers. Additionally or alternatively, the analytics server may store multiple 2D images of products in a library or request multiple 2D images of products from one or more vendors, databases and servers, converting the multiple 2D images into one or more 3D virtual objects using triangulation, for instance.

The analytics server may use the determined location of the product in the tote/on the autonomous robot (e.g., step 304) to create a positioning signal, the positioning signal positioning the virtual object (including sizing the virtual object, positioning the virtual object, and orienting the virtual object) on the obtained physical world data (images, sets of images, videos) using the 3D feature data.

The analytics server may also may display the pick path directions and/or product arrangement instructions using a graphical user interface (GUI) on a screen on the autonomous robot, a screen on wearable technology (e.g., glasses/headset displaying the GUI using a heads-up display, a watch), a screen on a handheld device (e.g., mobile phone), and the like.

Figure 6A:
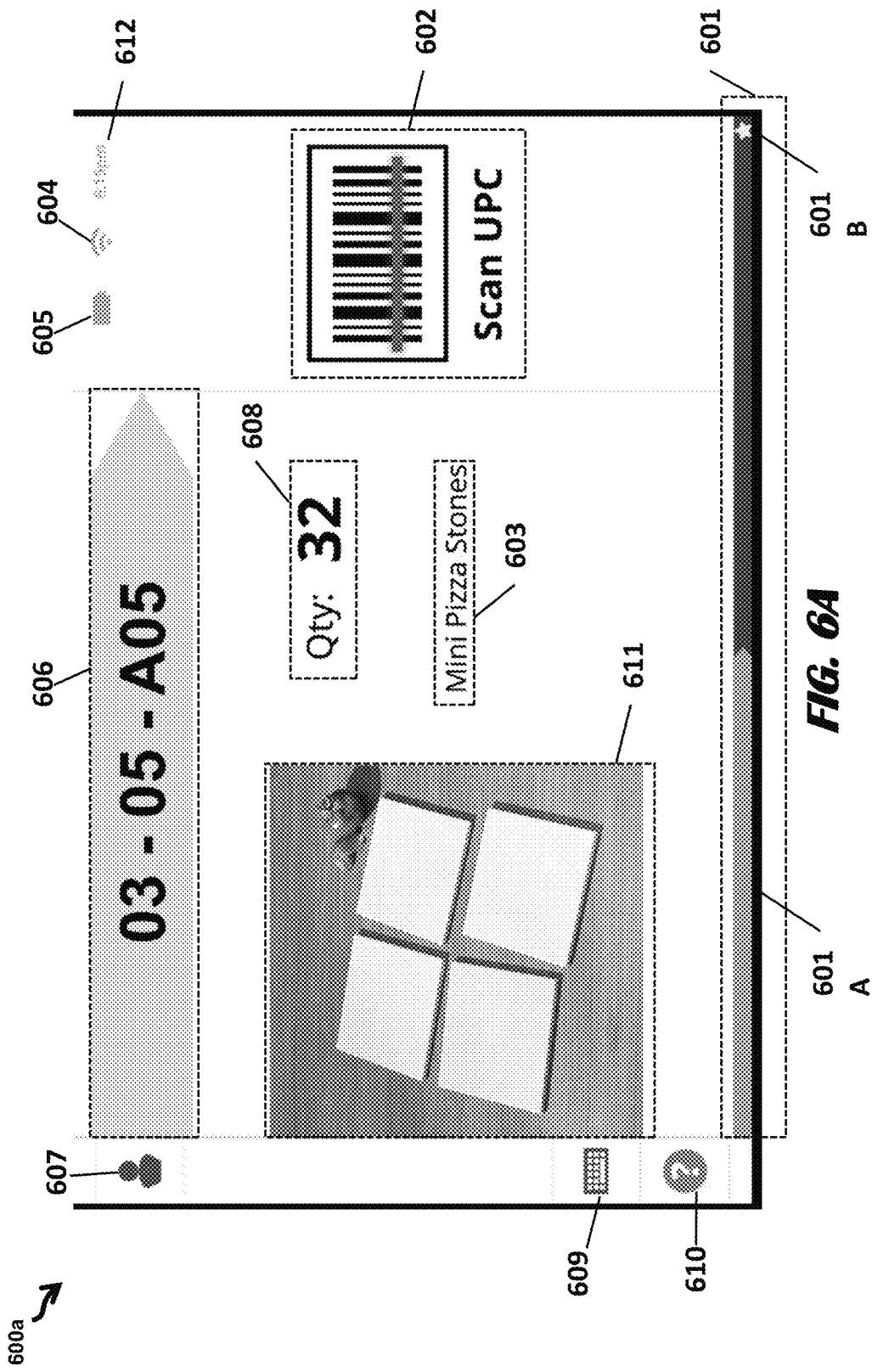
FIGS. 6A-6M show graphical user interfaces displayed to a picker, according to an embodiment.

FIG. 6A shows an example GUI displayed by the analytics server to a picker, according to an embodiment. The analytics server may display on the GUI: the product location on a shelf/bin, instructions to the product location, a product description, a quantity of a product (potentially broken into one or more units of measurement of the product), an image of the product, and a name (or location, image, description) of a next product, and the like.

GUI 600a displayed in FIG. 6A illustrates a pick screen displayed by the analytics server. The analytics server may display the name of the product 603 to be collected by the picker, an image 611 of the product to be collected by the picker, and a quantity 608 of the product to be collected by the picker. The analytics server may display the location 606 of the product to be collected by the picker using an aisle—shelf—bin number format for the location of the product. The analytics server may also display directions to the product using words (e.g., left at the first aisle, forward 200 feet) or an illustrated map (e.g., as shown in FIGS. 6L-6M).

The analytics server may display a progress indicator 601. The progress indicator 601 displayed on GUI 600a indicates a progression of the picker (e.g., measured by the capacity of the tote, progress of picker picking products based on the list of products to be picked). The bar 601A in the progress indicator may move as the picker picks products. The bay 601A may be visually distinguished from the process indicator 601 by colors, hatch patterns, and the like. The analytics server may indicate a completion of the progress indicator using a graphical indicator as shown in 601B.

The analytics server may display a barcode 602. The picker may scan the barcode 602 using a scanner when the picker collects the product, indicating to the analytics server that the product has been picked. In some embodiments, the autonomous robot may contain a barcode scanner such that when the product is inserted into the autonomous robot, for instance, into a tote on the autonomous robot, the autonomous robot scans the barcode of the product. Additionally or alternatively, wearable technology may scan the product. For instance, the picker's glasses may scan the product barcode and match the product barcode to displayed barcode 602. Additionally or alternatively, a picker's ring (e.g., a ring scanner) may scan the product barcode. Responsive to the scanned barcode, the analytics server may display a next screen (e.g., GUIs 600j-600k shown in FIGS. 6J-6K). The analytics server may also adjust the inventory of the warehouse responsive to the picked product.

The analytics server may use an interactive button (e.g., a graphical indicator configured to receive an input) such as buttons 607, 609 and 610 to display additional information to the picker. The picker may interact with the interactive buttons (e.g., 607, 609 and 610) by touching the icon of the interactive button on a touch screen on the autonomous robot (e.g. display 215 in FIG. 2A), pressing a button on a mobile device (e.g., cell phone, tablet, pendent) that is synchronized to the screen displayed by the analytics server, using a mouse, keyboard, or other controller configured to operate with a screen on the autonomous robot, and the like. For instance, the picker may interact with interactive button 607 to view information about the picker. For example, the analytics server may display a picker profile including the picker's name, picture, length of service, average pick rate, next shift, and a comparison to other pickers (e.g., a picker status board that provides status information for warehouse supervisors/management). The picker may interact with interactive button 609 to input feedback to the analytics server. For instance, the picker may feed information to the analytics server such as missing product information, damaged product information, and tote over capacitated (e.g., too heavy or too full). The picker may interact with interactive button 610 to seek help. The analytics server may provide help directly (e.g., display a guide instructing the picker on the functions of the analytics server and/or tote) or indirectly by connecting the picker to one or more supervisors or other pickers.

The analytics server may display other information to the picker such as the time 612 (current time, time that picker's shift ends), internet signal strength 604, and battery status 605. The time 612 may also be displayed using an analog clock. The internet signal strength 604 may also be indicated using words such as "strong" and "weak." The battery status 605 may also be depicted as a numerical percentage or in words.

Figure 6B:
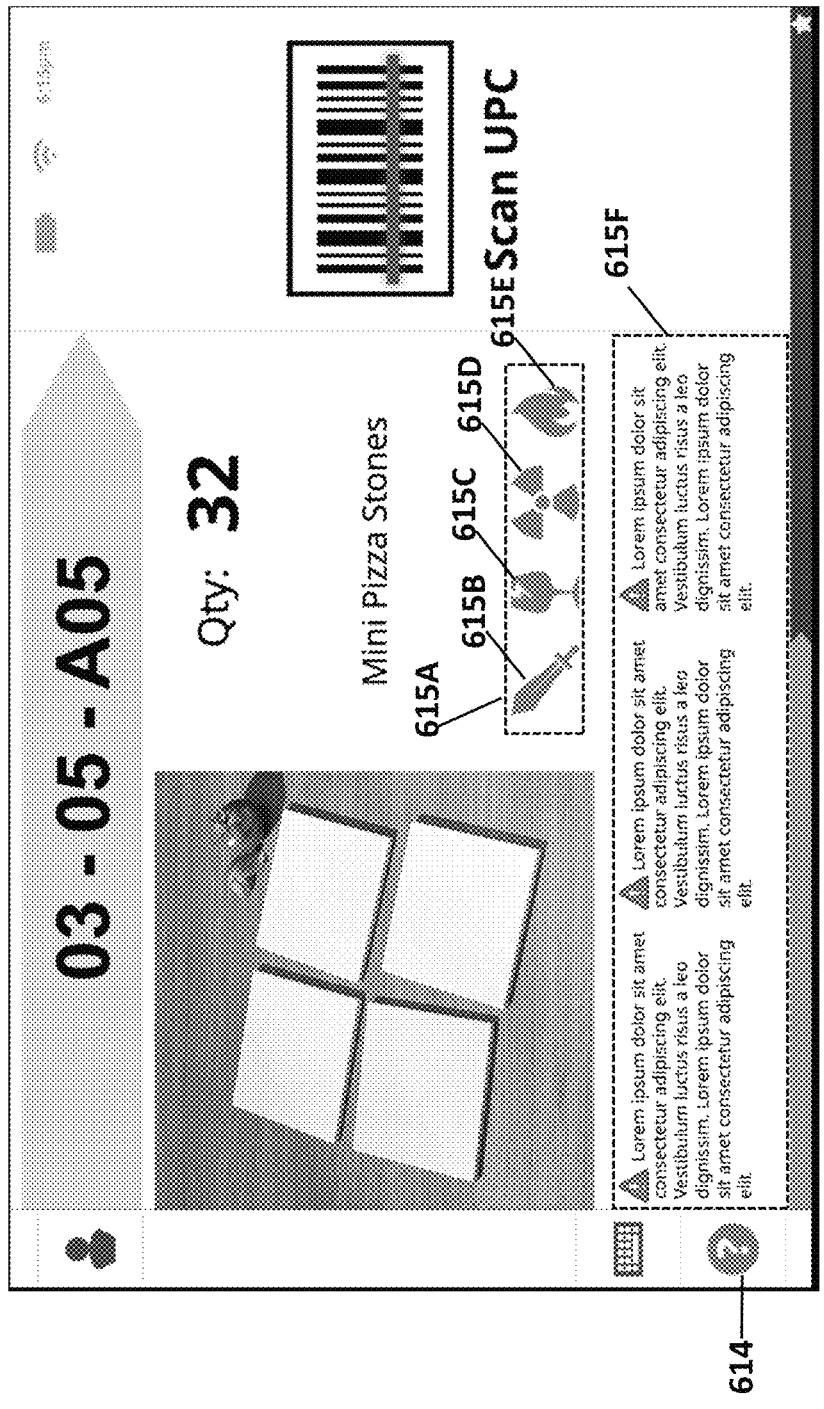

GUI 600b in FIG. 6B is an alternate embodiment of GUI 600a in FIG. 6A. The analytics server may display, in addition to the information described in relation to GUI 600a in FIG. 6A, one or more hazard graphical indicators 615A and/or hazard text 615F associated with the product to be collected by the picker. Hazard graphical indicators 615A may include, but are not limited to sharp graphical indicators 615B, fragile graphical indicators 615C, biohazard graphical indicators 615D, and flammable graphical indicators 615E. The hazard graphical indicators 615A may be visibly distinguishable from the rest of the GUI 600b. That is, the hazard graphical indicators 615A may be a color, pattern, luminescence, and the like. In some embodiments, the hazard text 615F is displayed by the analytics server in response to a picker interacting with a hazard graphical indicator 615A and/or a help button 614.

Figure 6C:
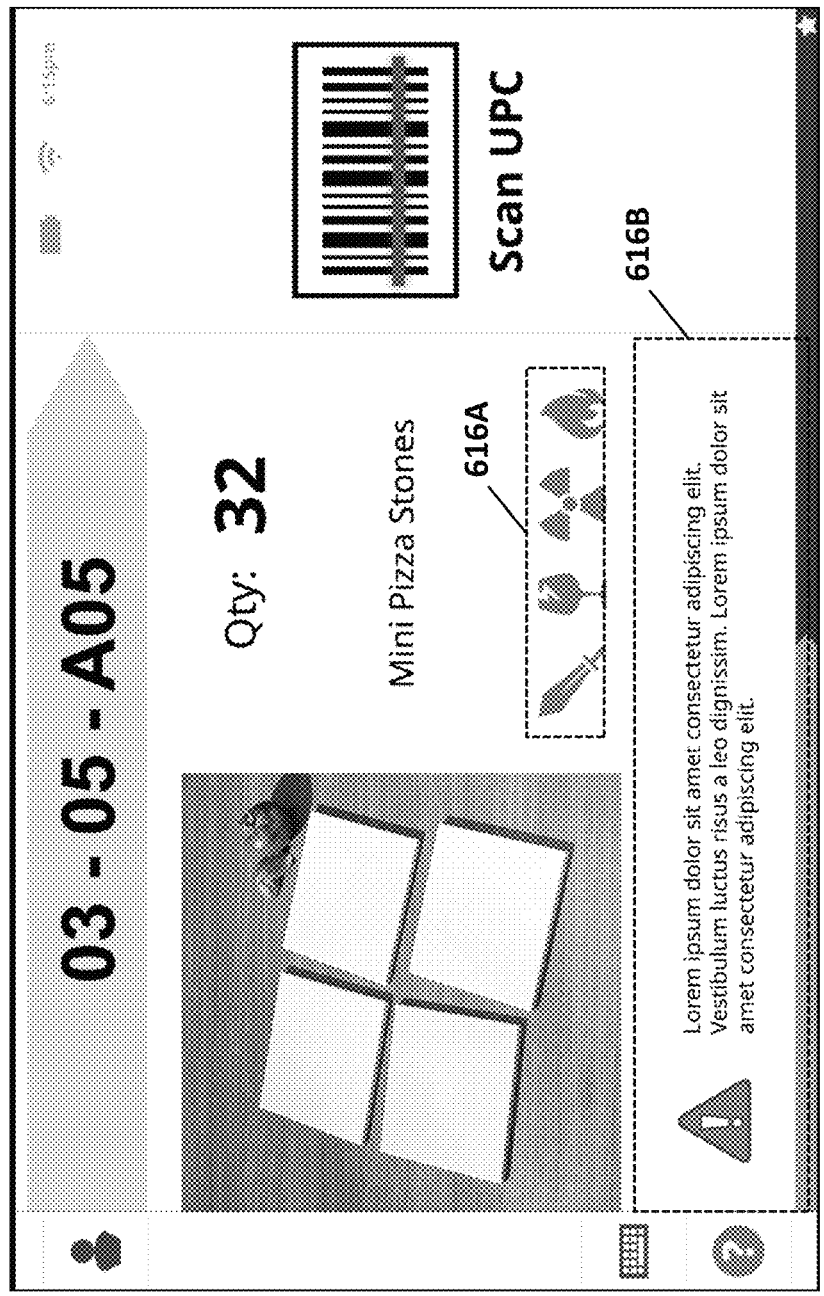

Each hazard graphical indicator 615A may have one or more associated hazard texts 615F. For instance, GUI 600b in FIG. 6B shows three hazard text boxes 615F that may be associated with one hazard graphical indicator such as hazard graphical indicator 615C. Additionally or alternatively, as shown in GUI 600c in FIG. 6C, the analytics server may display one hazard text box 616B associated with all of the hazard graphical indicators 616A. Referring back to GUI 600b, in some configurations, the picker may interact with one or more hazard graphical indicators 615A to indicate to the analytics server to display an associated hazard text 615F. That is, the hazard text 615F may change depending on an identified hazard graphical indicator 615A. Additionally or alternatively, the analytics server may always display hazard text 615F associated with all of the hazard graphical indicators 615A.

Figure 6D:
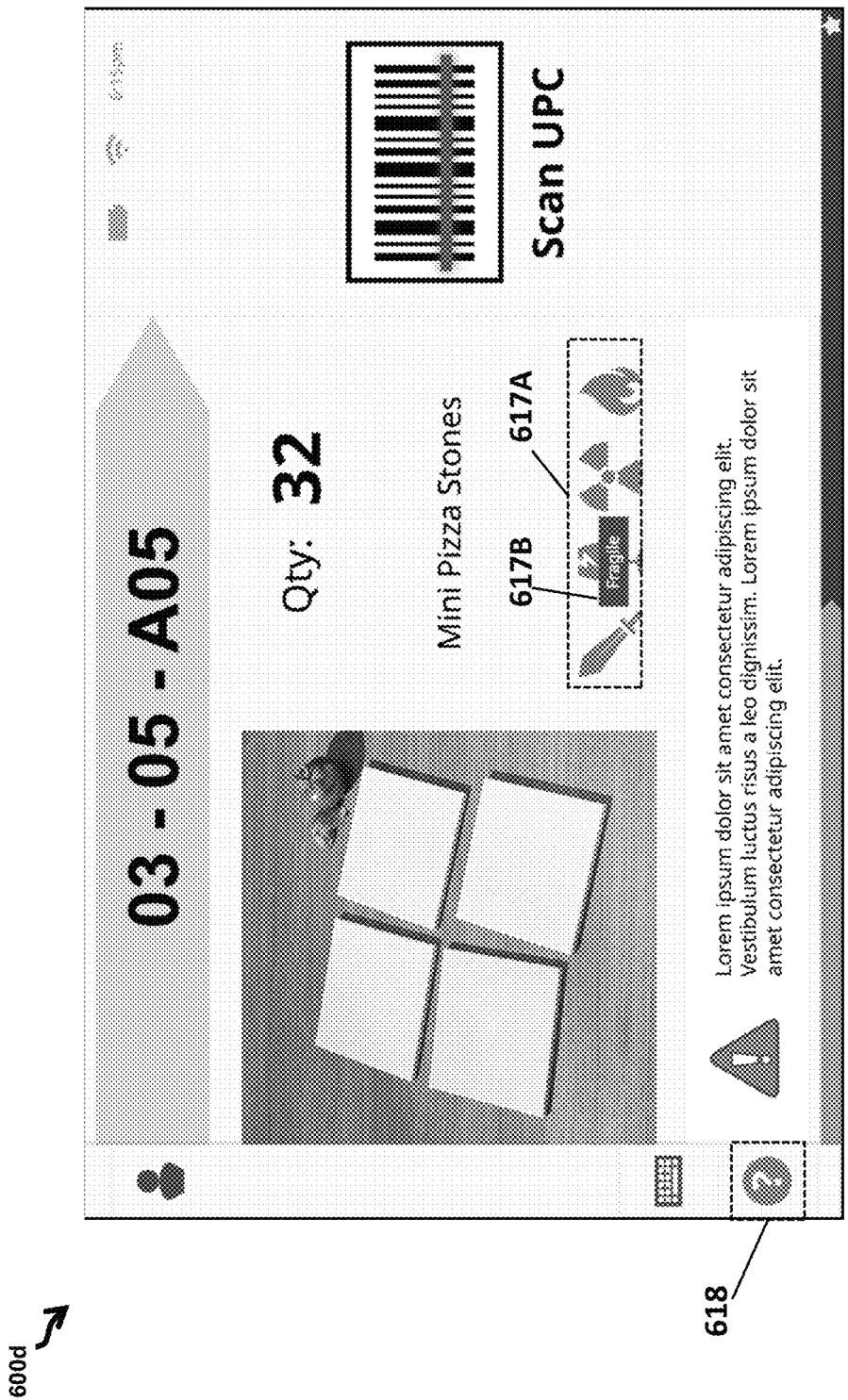

In some configurations, as shown in GUI 600d in FIG. 6D, a label 617B may be overlaid on one or more hazard graphical indicators 617A. The label 617B may be displayed by the analytics server in response to the picker interacting with a help button 618 (e.g., a legend for the hazard graphical indicators). Additionally or alternatively, one or more labels 617B may only be associated with active hazards. That is, the hazard graphical indicators 617A may always be displayed by the analytics server, and the label 617B may be displayed by the analytics server in the event that the product to be collected by the picker has an associated hazard (e.g., that the product to be collected by the picker is "fragile" as shown by label 617B).

The picker may interact with the displayed information (e.g., tapping the center of the screen, dragging down from the top of the screen to the bottom of the screen, pressing one or more buttons, making one or more gestures). Responsive to the interaction, the analytics server may display information 619 regarding a next product to be collected by the picker as shown in GUI 600e in FIG. 6E. The analytics server may display information 619 including an image 619A of the next product to be collected, a name 619B of the next product to be collected, and a quantity 619C of the next product to be collected.

Figure 6E:
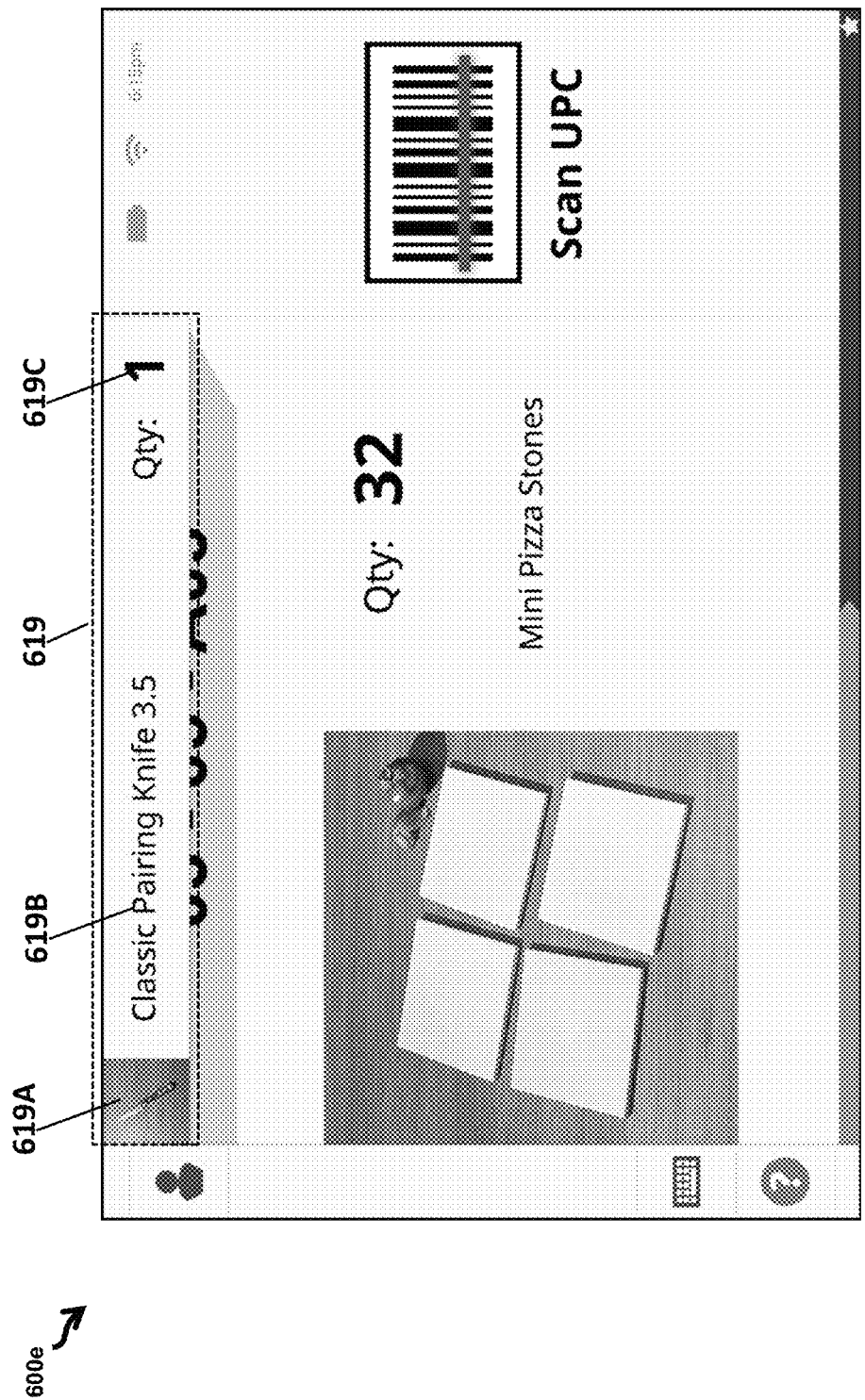
Figure 6F:
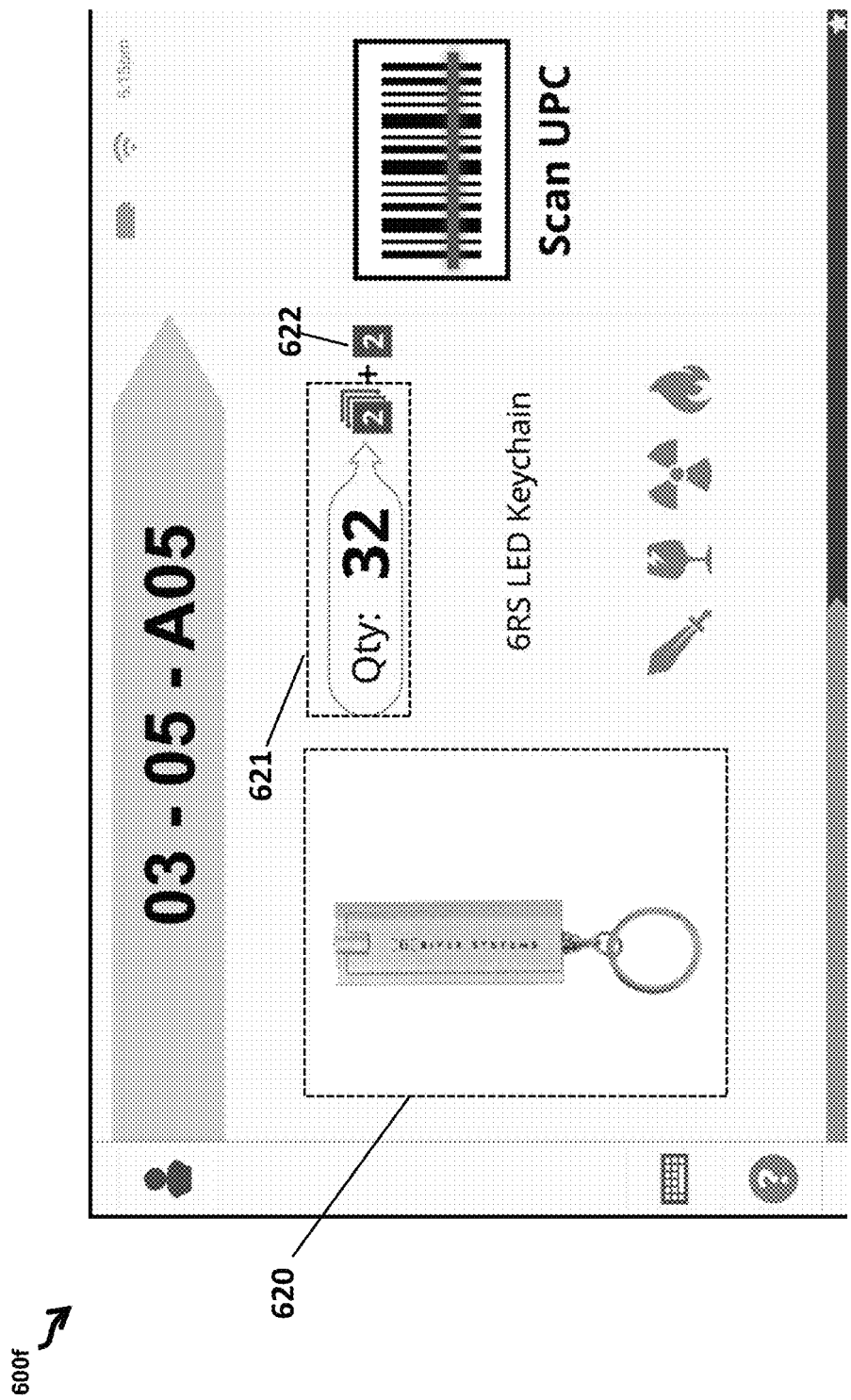
Figure 6G:
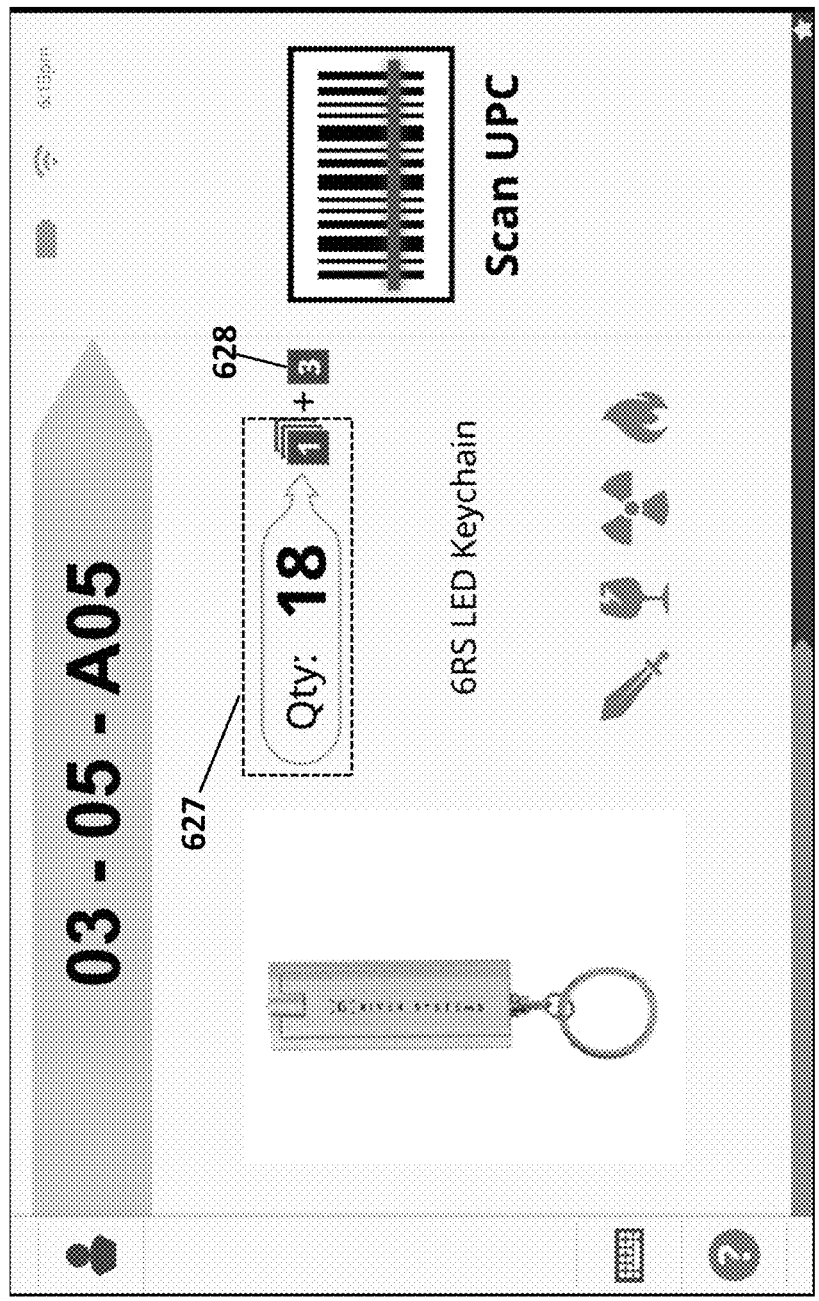
Figure 6H:
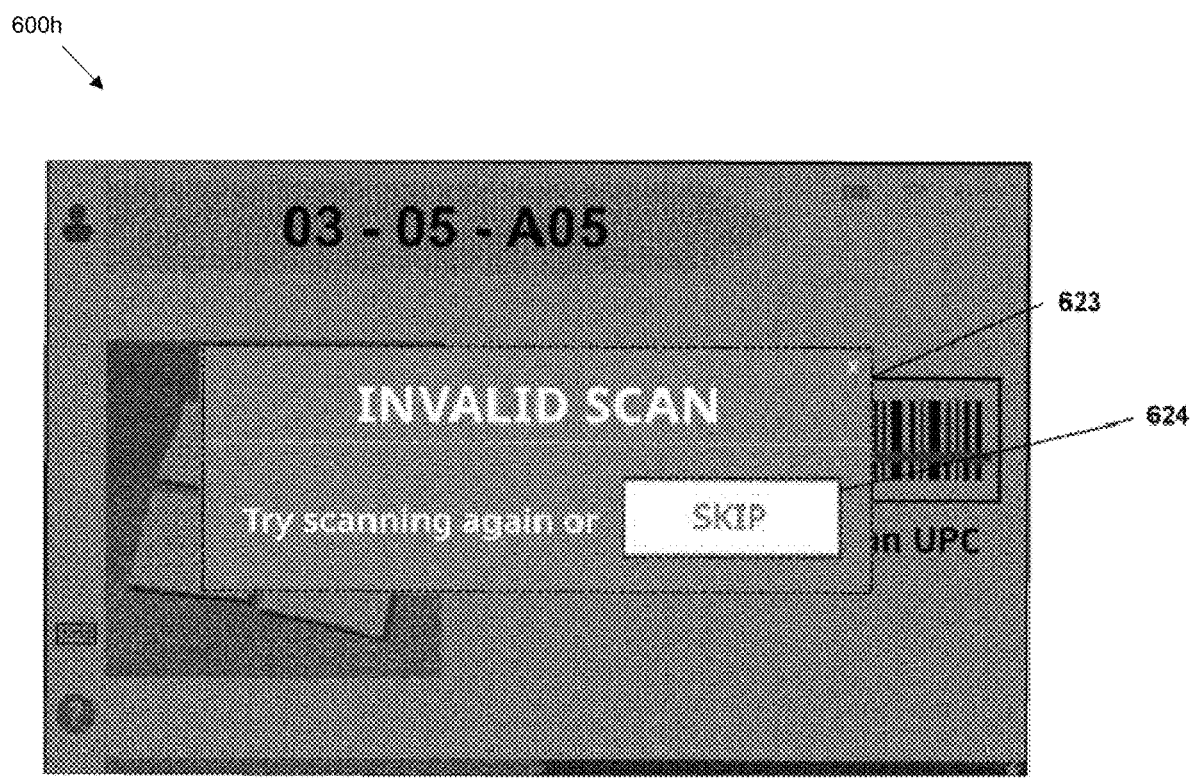
Figure 6I:
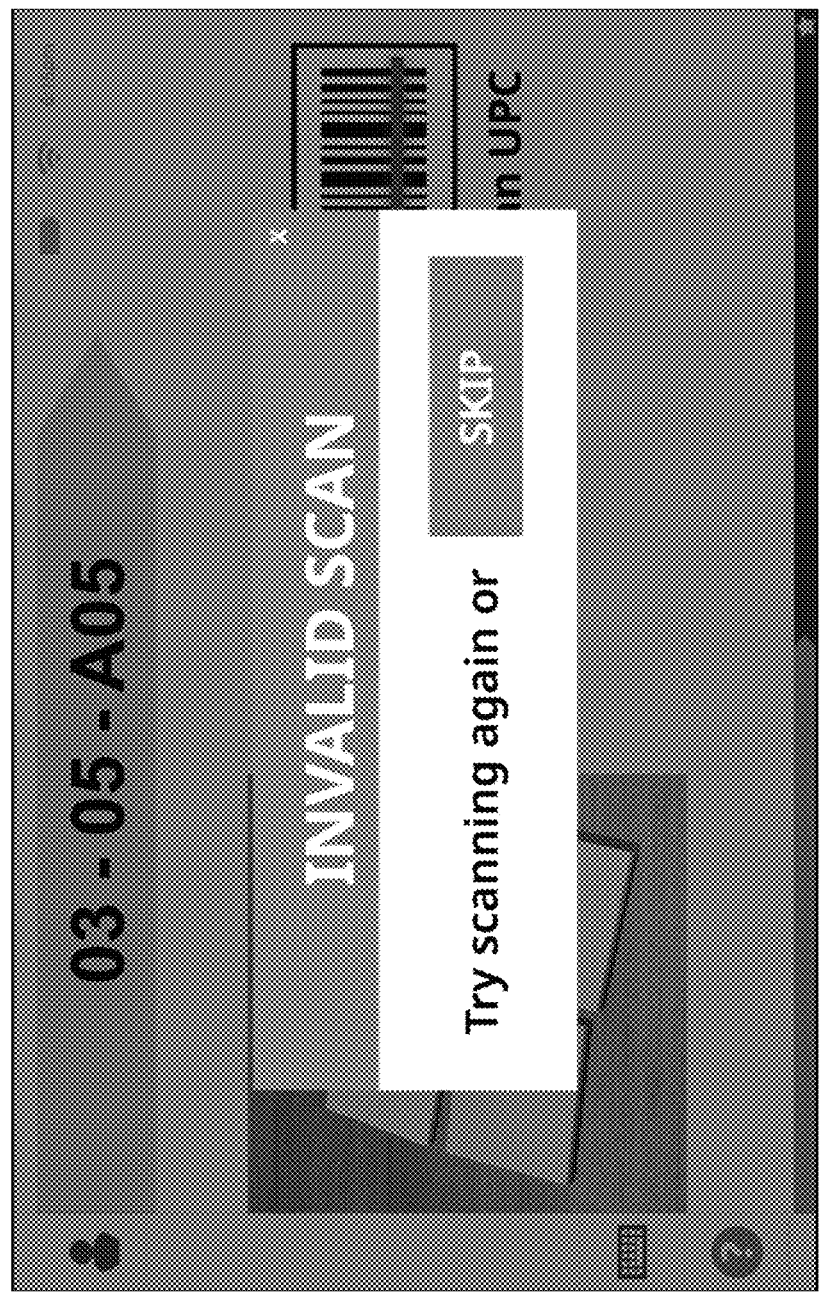
Figure 6J:
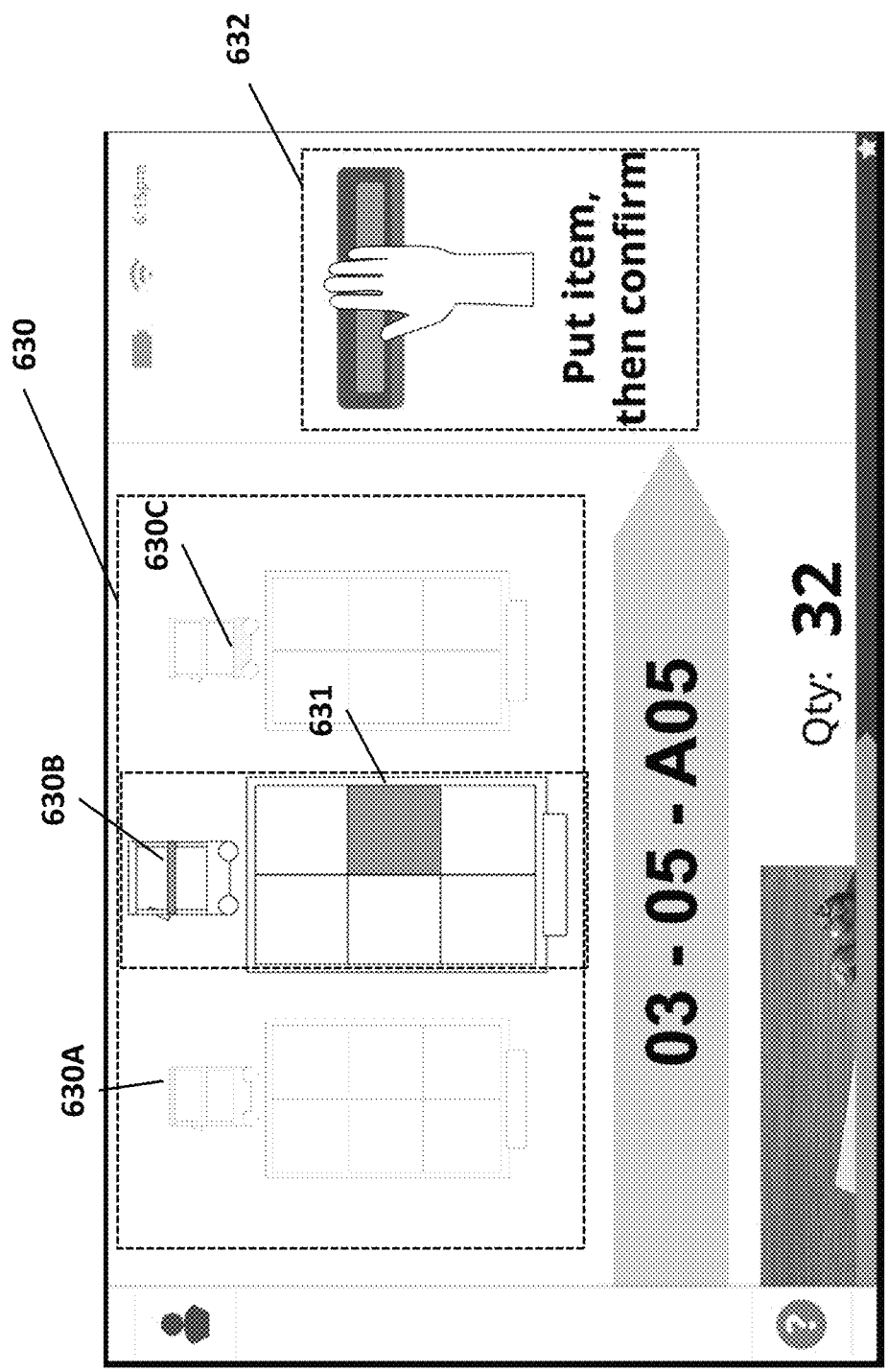
Figure 6K:
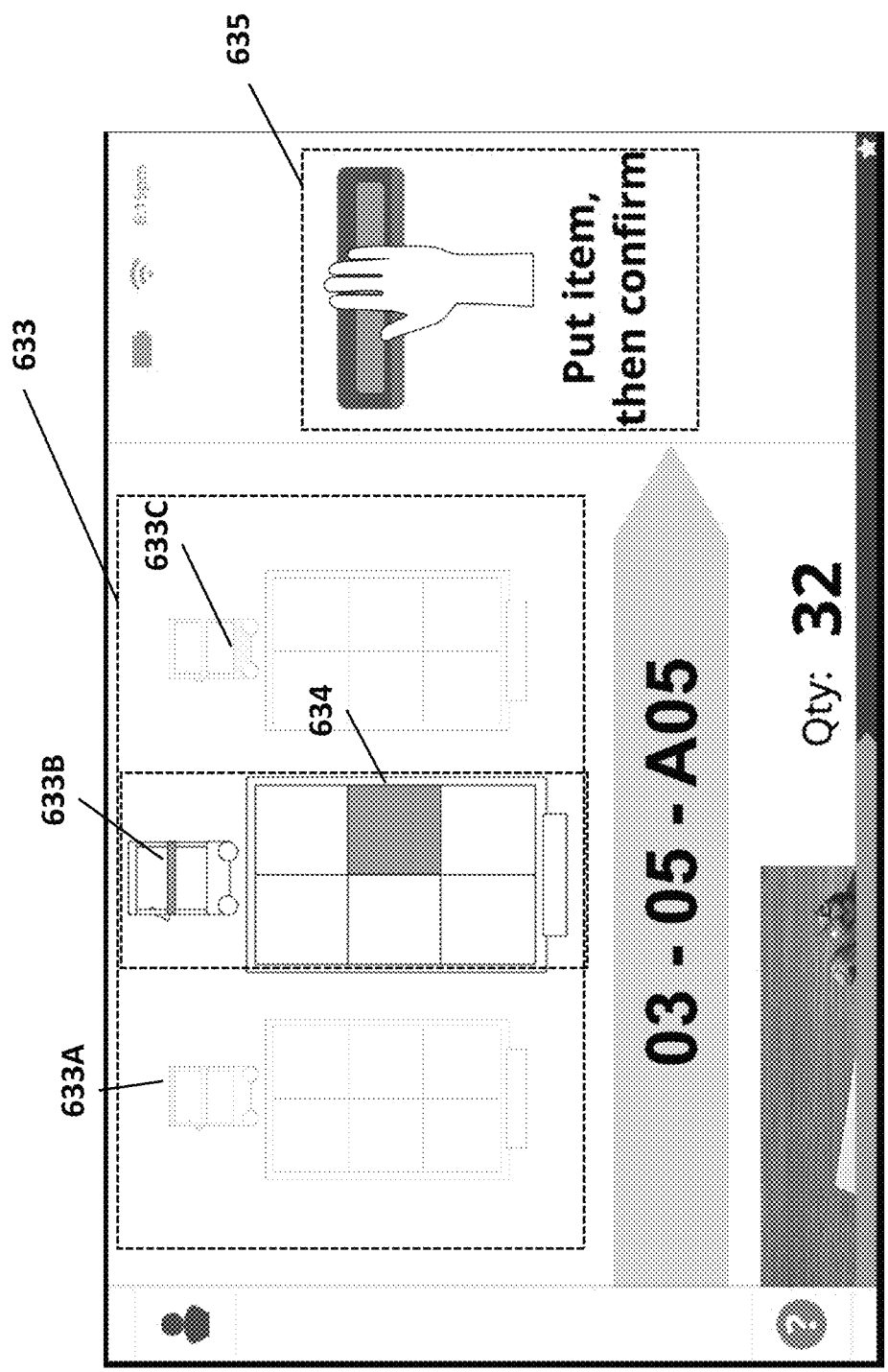
Figure 6L:
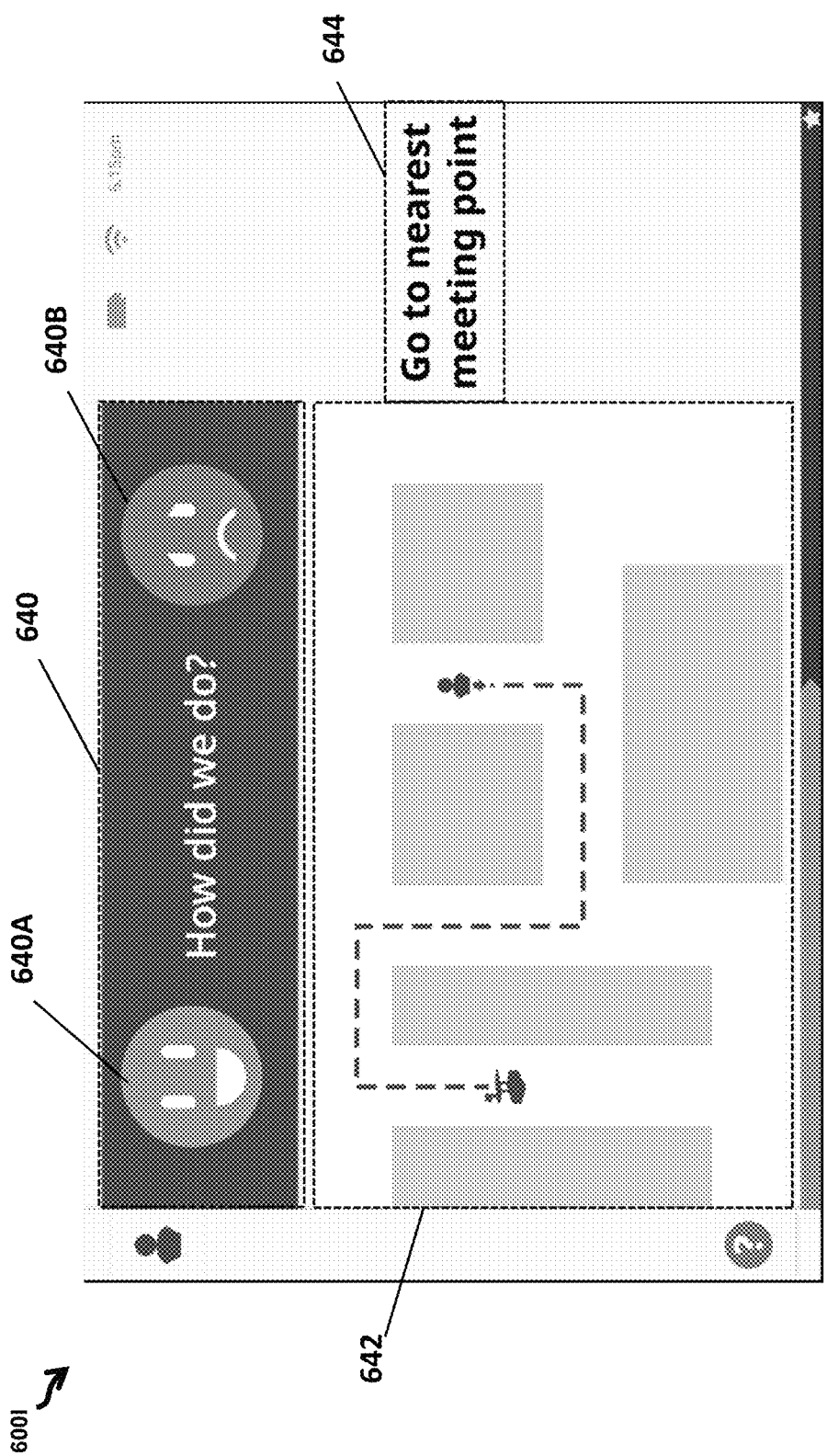
Figure 6M:
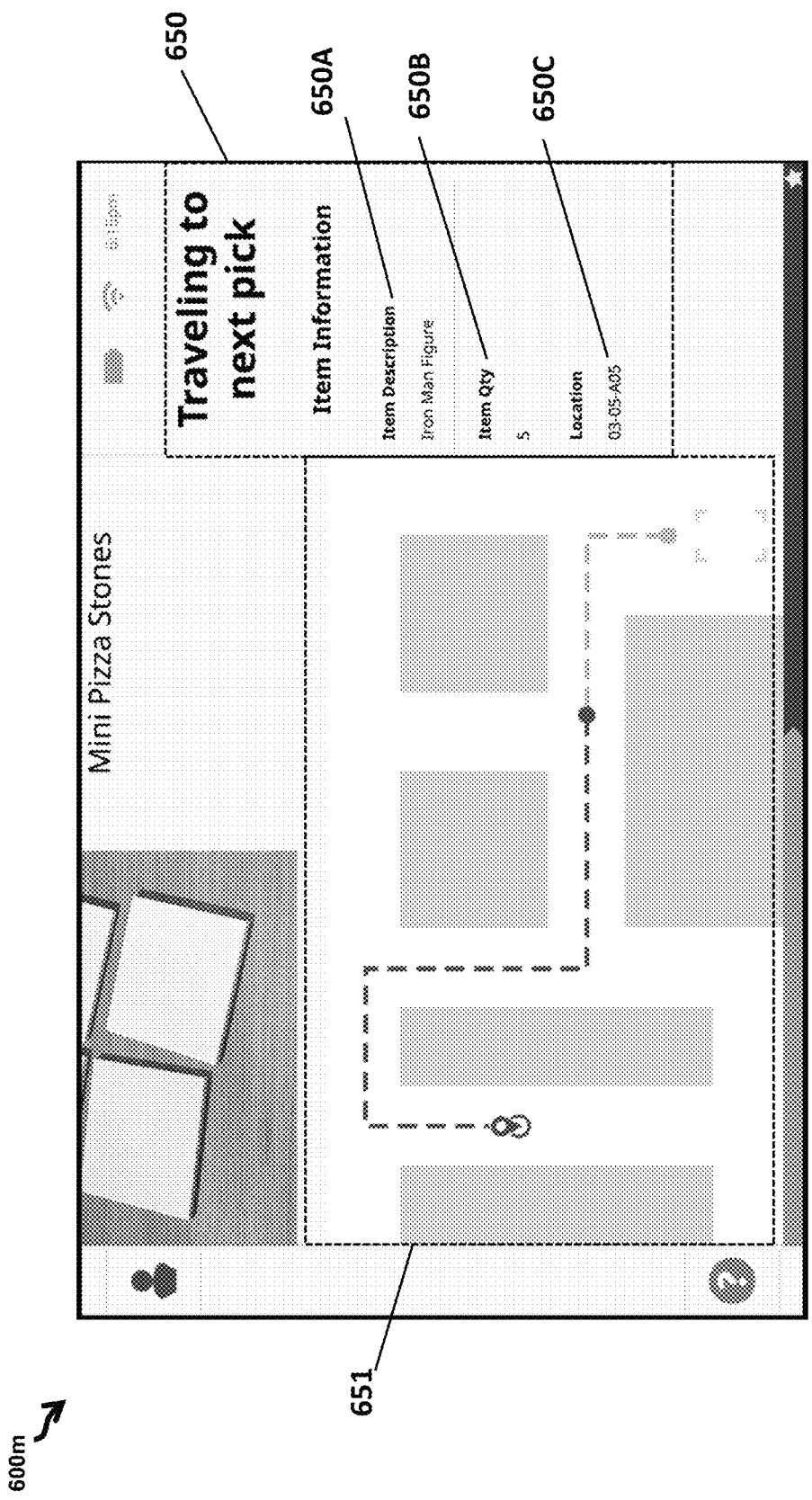

GUI 600m in FIG. 6M is an alternate embodiment of GUI 600e in FIG. 6E. The analytics server displays information 650 regarding the next product to be collected by the picker. The information 650 includes a product description 650A, a product quantity 650B and a location in the warehouse 650C. In addition to displaying information 650 regarding the next product to be collected by the picker, the analytics server may display the map 651, indicating how the picker efficiently navigates to the location indicated the location in the warehouse 650C.

When the picker arrives at the product location, the analytics server may instruct the picker to pick the product. "Clusterpicking" a product involves picking multiple of the same product to fulfill various orders for that product. The analytics server may instruct the picker to "clusterpick" the product and place the products in various totes. Additionally or alternatively, the analytics server may instruct the picker to pick particular units of measurement of the product. Some units of measurement of a product may be clusterpicked such that picking efficiency is improved. The analytics server may instruct a picker to clusterpick particular units of measure of particular products. For example, the size of the products to be picked and/or the products to be distributed across the totes may make clusterpicking particular units of measure of that product efficient. The analytics server may instruct the picker to place a quantity of the product in one or more totes and orient the product in particular placements in each of the totes. The product may be placed in a unique placement in each tote.

GUI 600f in FIG. 6F illustrates a scenario where the analytics server instructs the picker to pick a particular unit of measurement of a product, according to an embodiment. The analytics server may indicate the unit of measurement of the particular product, as shown by graphical indicator 621. Graphical indicator 621 describes that the unit of measurement to be picked by the picker has 32 products. The singular product is displayed by the analytics server in image 620. Additionally or alternatively, the image 620 may depict the unit of measurement. For instance, the analytics server may display the 6RS LED Keychain in a case of thirty-two Keychains because the picker is instructed to pick that particular unit of measurement as indicated by graphical indicator 621.

The analytics server may also indicate to the picker to clusterpick a product. Clusterpicking the product is picking the product to satisfy one or more orders. The analytics server may display graphical indicator 622 to instruct the picker to pick two of the unit of measurement indicated in graphical indicator 621. That is, the picker may pick two cases, each case containing thirty-two 6RS LED Keychains.

The analytics server may direct the picker to pick one case at a time for quality assurance, picker safety, and product safety.

GUI 600g in FIG. 6G is an alternate embodiment of GUI 600f in FIG. 6F. As shown, graphical indicator 627 in GUI 600g indicates that the picker should pick the unit of measurement containing eighteen 6RS LED Keychains. Graphical indicator 628 indicates that the picker should clusterpick three cases of graphical indicator 627. That is, the picker should pick three cases, each case containing eighteen 6RS LED Keychains.

GUI 600h in FIG. 6H illustrates a pop-up window 623 of a scenario where the analytics server detects an invalid scan, according to an embodiment. The analytics server may determine a valid barcode based on the product picked by the picker according to the optimal arrangement of products in the tote and/or on the autonomous robot. An invalid scan may be a scan that does not match the barcode based on the optimal arrangement of products in the tote and/or on the autonomous robot. For instance, the picker may pick an incorrect unit of measurement of the product with an associated barcode that does not match the barcode of the proper unit of measurement of the product. Additionally or alternatively, the picker may pick the product out of order, resulting in an arrangement deviating from the optimal arrangement of products in the tote and/or on the autonomous robot. The analytics server may display interactive button 624 such that the picker may interact with interactive button 624 and skip scanning the product again. GUI 600i in FIG. 6I is an alternate embodiment of GUI 600h in FIG.6H.

If the picker arrives at the product location and cannot pick the product (the product has shorted), the picker may interact with the analytics server (e.g., using the autonomous robot, the handheld device, the wearable technology). Additionally or alternatively, the picker may indicate to the analytics server that the product is available, but has one or more constraints. Product constraints may include damage to the product and/or a limitation of the product to an orientation. For example, an open can of paint may prohibit the picker from arranging the can of paint on its side. The picker may indicate the product constraint by inputting a selection (e.g., selecting "wrong orientation") on the autonomous robot. Additionally or alternatively, the picker may indicate to the analytics server that the tote is too full. Responsive to picker input (the tote is too full, the product won't fit in the tote), the analytics server may re-evaluate the arrangement of the tote in real time or near real time (as described in FIG. 5), by reconsidering the combinations of products in the tote that result in the smallest available airspace of the tote. The analytics server continues to iterate this process until the optimal arrangement is achieved. Based on the re-evaluated arrangement of the tote, the analytics server may update the picking path. The analytics server may determine, based on the re-evaluated arrangement of the tote, that the product can fit in the tote on a different level, zone, arrangement, or orientation. Additionally or alternatively, the analytics server may remove the product from the picker's pick list such that the product is arranged in a different tote on a different autonomous robot. Additionally or alternatively, the analytics server may arrange the product in a different tote on the same autonomous robot. Such a decision may be made before picking initiates.

The analytics server may be limited in the operations that the analytics server may perform once the analytics server has received the order (e.g., step 302 in FIG. 3). For example, the analytics server may not remove the product from the picker's path upon re-evaluating the arrangement of products in the tote, as discussed herein. Additionally or alternatively, the analytics server may not re-evaluate the arrangement of the tote given a product short or other product constraint. Additionally or alternatively, the analytics server may re-evaluate the arrangement of the products in the tote given single orders, for instance, but may not re-evaluate the arrangement of the products in the tote given groups order or consolidated orders. Additionally or alternatively, a large group order may be pre-arranged and/or pre-allocated.

Placing the Product

Referring back to FIG. 3, in step 308, the analytics server may transmit instructions for product placement to the picker. The analytics server may display visual instructions arranging the product in the particular tote, or in the particular position in the tote. The analytics server may also audibly communicate the instructions to the picker. The analytics server may instruct the picker to position the product on top of a previously-picked product already placed in the tote.

FIG. 6J shows an example GUI 600j illustrating a set of arrangement instructions displayed by the analytics server, according to an embodiment. The analytics server instructs the picker where to place the collected product in the tote and/or on the autonomous robot. Levels may divide the autonomous robot (such as level 422 in FIG. C). Graphical indicator 630 depicts an autonomous robot with three levels (e.g., levels 630A, 630B, 630C), each level having a tote. The analytics server may direct the picker where to position the product in a tote on a particular level. Graphical indicator 630B depicts an emphasized second level of the autonomous robot, indicating that the analytics server is directing the picker to arrange the product in a tote on the second level of the autonomous robot. Levels may be emphasized upon being visually distinct from the other levels of the tote (e.g., colors, luminescence, and transparency). Further, graphical indicator 631 directs the picker to the particular position that the picker should place the product in the tote on the second level. In some configurations, the area of the tote indicated by graphical indicator 631 may be illuminated on the tote itself by the analytics server, indicating a location for placing the product in the tote. The picker may confirm the arrangement of the product in the tote by interacting with graphical indicator 632. Additionally or alternatively, the analytics server may automatically detect the proper arrangement of the product in the tote. In alternate implementations, the analytics server may display the product's arrangement and orientation in the tote in more detail. For instance, the analytics server may use AR to instruct the picker to place the product in the particular orientation of the level of the tote.

GUI 600k in FIG. 6K is an alternate embodiment of GUI 600j in FIG. 6J. Because a picklist/pick path may utilize one or more totes (either due to multiple orders being picked at once, or due to a single order requiring the use of multiple totes), the analytics server may instruct the picker to the particular tote to place the product. The analytics server may also instruct the picker to place the product at the particular position on the autonomous robot. Autonomous robots may be divided using shelves (such as shelves 204, 206 in FIG. 2A). Graphical indicator 633 displays the autonomous robot with three shelves (e.g., 633A, 633B, 633C). The analytics server instructs the picker where to place the collected product in which tote on the autonomous robot and/or on the autonomous robot itself. Graphical indicator 633B depicts an emphasized second shelf of the autonomous robot, indicating that the analytics server is directing the picker to put the product on the second shelf of the autonomous robot. Shelves of the autonomous robot may be emphasized upon being visually distinct from the other shelves of the autonomous robot (e.g., colors, luminescence, and transparency). Further, graphical indicator 634 directs the picker to put the product in the particular tote on the second shelf of the autonomous robot. In some configurations, the analytics server may illuminate the tote indicated by graphical indicator 631. The picker may confirm the arrangement of the product in the tote by interacting with graphical indicator 635. Additionally or alternatively, the analytics server may automatically detect the proper arrangement of the product in the tote. In alternate implementations, the analytics server may display the product's arrangement and orientation in the tote in more detail. For instance, the analytics server may use AR to instruct the picker to place the product in the particular orientation of the level of the tote.

Figure 7:
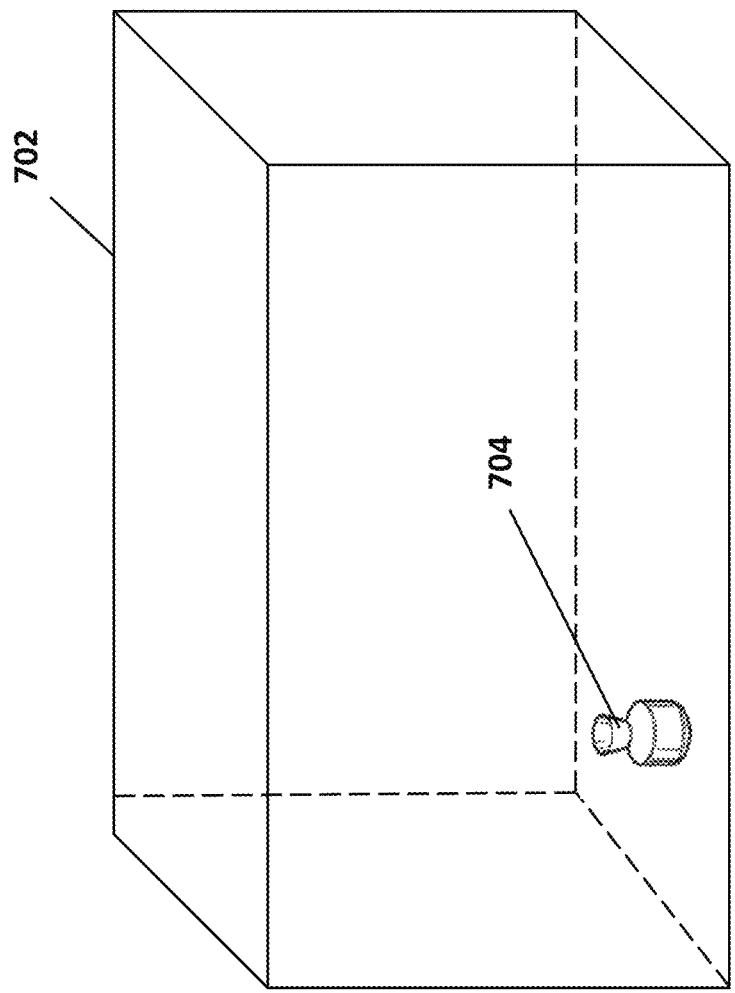
FIG. 7 shows an application of augmented reality, according to an embodiment.

FIG. 7 shows an example 700 of a tote 702 supplemented with a virtual object 704. The analytics server, using AR, recognizes the tote 702 in the real world and supplements the tote with the virtual object 704 such that the user can place the real object in the same position and orientation as the virtual object 704. The analytics server sizes, positions and orients the virtual object 704 in the real world tote 702. The analytics server may update the overlaid position of the virtual object 704 on the tote 702 in real time (or near real time).

In some configurations, the analytics server may provide the opportunity for the picker to provide feedback. For example, after the picker has picked the product and arranged the product in the tote, the picker, while navigating to a next location, may provide feedback to the analytics server. FIG. 6L illustrates an example GUI 600*l* requesting feedback as the picker is following a next set of instructions 644, according to an embodiment. After the picker has arranged the product in the tote, the picker may provide feedback to the analytics server, as shown by graphical indicator 640. In the event the picker was successfully able to arrange the product in the tote, the picker may interact with interactive button 640A. In the event the picker was not able to successfully arrange the product in the tote given the instructions by the analytics server (e.g., the picker had to make some decisions for themselves such as put the product in a different location of the tote), the picker may interact (e.g., touch, press, push, or otherwise select) with interactive button 640B. The analytics server may instruct the picker to a next location in the warehouse using the warehouse map 642. The analytics server may instruct the picker what to do using the instructions 644. As shown, instructions 644 instruct the picker to proceed to the nearest meeting point. Additionally or alternatively, the instructions 644 may instruct the picker to pick a subsequent product, proceed to a pick station, proceed to a pack station, proceed to a break area, and the like.

In one embodiment, a computer-implemented method comprises determining, by a computer, an arrangement for a plurality of products in at least one container based on a respective attribute of each of the plurality of products, the arrangement based on a parameter of the container. The computer can determine a picking path for collecting the plurality of products based on the arrangement of the one or more of products in the at least one container. The computer can transmit instructions for displaying, for each location along the picking path, a placement of a next product in the plurality of products in the at least one container.

In another embodiment, a system comprises a server configured to determine an arrangement for a plurality of products in at least one container based on a respective attribute of each of the plurality of products, the arrangement based on a parameter of the container; determine a picking path for collecting the plurality of products based on the arrangement of the one or more of products in the at least one container; and transmit instructions for displaying, for each location along the picking path, a placement of a next product in the plurality of products in the at least one container.

In yet another embodiment, a machine-readable storage medium has computer-executable instructions stored thereon that, when executed by one or more processors, cause the one or more processors to perform operations. The operations can comprise determining an arrangement for a plurality of products in at least one container based on a respective attribute of each of the plurality of products, the arrangement based on a parameter of the container; determining a picking path for collecting the plurality of products based on the arrangement of the one or more of products in the at least one container; and transmitting instructions for displaying, for each location along the picking path, a placement of a next product in the plurality of products in the at least one container.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc. are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method of picking a plurality of orders, each of the plurality of orders comprising one or more products:
   determining, by a computer, an arrangement for one or more of the plurality of the products in at least one picking container, the at least one picking container being carried by an autonomous vehicle, the arrangement being based on at least one of a respective product attribute of each of the plurality of products, and on at least one parameter of the picking container;
   determining, by the computer, a picking path for the autonomous vehicle for picking the plurality of products based on the arrangement of the one or more of products in the at least one picking container and the location of each of the plurality of products within a storage facility; and
   transmitting, by the computer, instructions for displaying, for each location of a plurality of locations along the picking path, a placement of a next product in the at least one picking_container such that the arrangement of the one or more of products minimizes the remaining volume in said picking container in order to optimize the pick rate.

2. The method according to claim 1, wherein at least one product attribute is volume, and wherein determining the arrangement comprises determining, by the computer, a remaining volume of the at least one picking container after the placement of at least one of the plurality of products.

3. The method according to claim 2, further comprising determining, by the computer, dimensions of the remaining volume of the at least one picking container after the placement of at least one of the plurality of products.

4. The method according to claim 1, wherein at least one product attribute is a product orientation limitation, and wherein determining the arrangement comprises determining, by the computer, an orientation of a product of the plurality of products in the at least one picking container, the orientation of the product of the plurality of products distinct from the product orientation limitation.

5. The method according to claim 1, wherein determining the arrangement further comprises iteratively simulating, by the computer, a volume of the at least one picking container by placing the plurality of products in a differentcombination.

6. The method according to claim 1, wherein determining the arrangement further comprises configuring, by the computer, the at least picking one container into a plurality of portions, and wherein the arrangement comprises a placement of each product of the plurality of products into a particular portion of the plurality of portions.

7. The method according to claim 1, wherein at least one product attribute is fragility, and wherein determining the arrangement further comprises determining, by the computer, a placement of a product in a portion of a plurality of portions in the at least one picking container based on the fragility of the product.

8. The method according to claim 1, wherein at least one product attribute is weight, and wherein determining the arrangement further comprises determining, by the computer, a placement of a product in a portion of a plurality of portions in the at least one picking container based on the weight of the product.

9. The method according to claim 1, wherein the displayed placement of the product of the plurality of products includes a particular position within the at least one picking container.

10. The method according to claim 1, wherein determining the arrangement further comprises determining, by the computer, whether any product of the plurality of products can be substituted for a size variant of the product.

11. A system of picking a plurality of orders, each of the plurality of orders comprising one or more products:
   a server configured to:

determine an arrangement for a one or more of the plurality of the products in at least one picking container, the at least one picking container being carried by an autonomous vehicle, the arrangement being based on at least one of a respective product attribute of each of the plurality of products, and on at least one parameter of the picking container;

determine a picking path for the autonomous vehicle for picking the plurality of products based on the arrangement of the one or more of products in the at least one picking container and the location of each of the plurality of products within a storage facility; and transmit instructions for displaying, for each location of a plurality of locations along the picking path, a placement of a next product in the at least one container such that the arrangement of the one or more of products minimizes the remaining volume in said picking container in order to optimize the pick rate.

12. The system of claim 11, wherein at least one product attribute is volume, and wherein determining the arrangement comprises determining a remaining volume of the at least one picking container after the placement of at least one of the plurality of products.

13. The system of claim 12, wherein the server is configured to determine dimensions of the remaining volume of the at least one picking container after the placement of at least one of the plurality of products.

14. The system of claim 11, wherein at least one product attribute is a product orientation limitation, and wherein determining the arrangement comprises determining, an orientation of a product of the plurality of products in the at least one picking container, the orientation of the product of the plurality of products distinct from the product orientation limitation.

15. The system of claim 11, wherein the server is configured to determine the arrangement by iteratively simulating, a volume of the at least one picking container by placing the plurality of products in a different combination.

16. The system of claim 11, wherein the server is configured to determine the arrangement by configuring the at least one picking container into a plurality of portions, and wherein the arrangement comprises a placement of each product of the plurality of products into a particular portion of the plurality of portions.

17. The system of claim 11, wherein at least one product attribute is fragility, and wherein determining the arrangement further comprises determining a placement of a product in a portion of a plurality of portions in the at least one picking container based on the fragility of the product.

18. The system of claim 11, wherein at least one product attribute is weight, and wherein determining the arrangement further comprises determining a placement of a product in a portion of a plurality of portions in the at least one picking container based on the weight of the product.

19. The system of claim 11, wherein the server is configured to determine whether any product of the plurality of products can be substituted for a size variant of the product.

20. A non-transitory machine-readable storage medium for picking a plurality of orders, each of the plurality of orders comprising one or more products, the non-transitory machine-readable storage having computer-executable instructions stored thereon that, when executed by one or more processors, cause the one or more processors to perform operations comprising:

determining an arrangement for one or more of the plurality of the products in at least one picking container, the at least one picking container being carried by an autonomous vehicle, the arrangement being based on at least one of a respective product attribute of each of the plurality of products, and on at least one parameter of the picking container;

determining a picking path for the autonomous vehicle for picking the plurality of products based on the arrangement of the one or more of products in the at least one container and the location of each of the plurality of products within a storage facility; and transmitting instructions for displaying, for each location of a plurality of locations along the picking path, a placement of a next product in the at least one container such that the arrangement of the one or more of products minimizes the remaining volume in said picking container in order to optimize the pick rate.

* * * * *